US005301047A

United States Patent [19]

Hoshino et al.

[11] Patent Number: 5,301,047

[45] Date of Patent: Apr. 5, 1994

[54] LIQUID CRYSTAL DISPLAY

[75] Inventors: Minoru Hoshino; Yoshiharu Nagae, both of Hitachi; Masahiro Takasaka; Masaaki Kitajima, both of Hitachiohta; Kiyoshige Kinugawa, Chiba, all of Japan

[73] Assignee: Hitachi, Ltd., Tokyo, Japan

[21] Appl. No.: 98,248

[22] Filed: Jul. 29, 1993

Related U.S. Application Data

[63] Continuation-in-part of Ser. No. 922,009, Aug. 4, 1992, abandoned, which is a continuation of Ser. No. 523,378, May 15, 1990, abandoned.

[30] Foreign Application Priority Data

May 17, 1989 [JP] Japan ................................ 1-123894

[51] Int. Cl.[5] ...................... G09G 3/36; G02F 1/1343; G02F 1/137

[52] U.S. Cl. ...................................... 359/55; 359/84; 359/85; 345/95

[58] Field of Search .................. 350/331 R, 332, 333; 340/784; 359/55, 84, 85

[56] References Cited

U.S. PATENT DOCUMENTS

| | | | |
|---|---|---|---|
| 4,082,430 | 4/1978 | Schulthess et al. | 350/333 |
| 4,395,709 | 7/1983 | Nagae et al. | 340/784 |
| 4,556,880 | 12/1985 | Hamada | 340/384 X |
| 4,703,305 | 10/1987 | Ayliffe | 340/784 |
| 4,769,639 | 9/1988 | Kawamura et al. | 340/784 |
| 4,801,933 | 1/1989 | Yamamoto et al. | 359/55 X |
| 4,804,951 | 2/1989 | Yamashita et al. | 350/333 X |
| 4,834,504 | 5/1989 | Garner | 350/332 |
| 4,899,141 | 2/1990 | Morozumi et al. | 340/784 |
| 4,926,168 | 5/1990 | Yamamoto et al. | 340/784 |
| 4,955,697 | 9/1990 | Tsukada et al. | 350/332 |
| 5,010,328 | 4/1991 | Morris et al. | 350/333 X |
| 5,202,676 | 4/1993 | Yamazaki | 359/55 |

FOREIGN PATENT DOCUMENTS

| | | | |
|---|---|---|---|
| 3709086 | 9/1987 | Fed. Rep. of Germany . | |
| 62-83724 | 4/1987 | Japan | 350/332 |
| 62-83725 | 4/1987 | Japan | 350/331 R |
| 62-86333 | 4/1987 | Japan | 350/331 R |
| 62-03228 | 9/1987 | Japan | 350/332 |
| 62-267725 | 11/1987 | Japan | 350/332 |
| 63-55530 | 3/1988 | Japan | 350/332 |
| 63-73227 | 4/1988 | Japan . | |
| 63-240528 | 10/1988 | Japan . | |

*Primary Examiner*—William L. Sikes
*Assistant Examiner*—Ron Trice
*Attorney, Agent, or Firm*—Kenyon & Kenyon

[57] ABSTRACT

A liquid crystal display includes a liquid crystal matrix panel for displaying information having a plurality of liquid crystal pixels which are arranged in a matrix and to which driving voltages are applied from X electrodes and Y electrodes, a driving circuit for supplying the driving voltages to the Y electrodes, and a circuit for superimposing a compensating voltage for masking waveform distortion of a liquid crystal driving voltage by constantly changing the waveform thereof on at least one of the X electrode driving circuit and the Y electrode driving circuit.

14 Claims, 28 Drawing Sheets

LIQUID CRYSTAL DISPLAY

VOLTAGE APPLIED TO PIXEL $V_0 = V_1 - V_2, -V_0 = V_2 - V_1$ $1/a \cdot V_0 = V_4 - V_5,\ V_1 - V_6 \qquad -1/a \cdot V_0 = V_3 - V_6, V_2 - V_5$ $(1-2/a) \cdot V_0 = V_3 - V_2, \qquad -(1-2/a) \cdot V_0 = V_4 - V_1$

LIQUID CRYSTAL DISPLAY

This application is a continuation-in-part of application Ser. No. 07/922,009 filed on Aug. 4, 1992, now abandoned, which is a continuation of application Ser. No. 07/523,378, filed on May 15, 1990 now abandoned.

BACKGROUND OF THE INVENTION

1. Field of the Invention

The present invention relates to a liquid crystal display, and particularly to a means for driving a liquid crystal display which is capable of decreasing crosstalk and which is suitable for obtaining a high quality display.

2. Description of the Related Art

Conventional liquid crystal matrix displays use, as a driving voltage to be applied to a single pixel, the voltage difference between the voltages applied to each X electrode and each Y electrode.

One of such driving methods is the optional bias driving method disclosed in Japanese Patent Publication No. 57-57718. The driving circuits used for realizing the driving methods are disclosed in Japanese Patent Laid-Open Nos. 53-38935, 58-176694, 60-21273 and 61-176694 and Japanese Patent Publication No. 61-51774.

In the conventional methods, it is assumed that both of the front edge and rear edge of a driving pulse have a clear right-angled shape. However, the actual waveform of the driving voltage applied to a single pixel is distorted by the load applied during driving and depends upon the content displayed. This consequently causes the occurrence of variations in brightness and of crosstalk in a screen even when the same information is displayed. The crosstalk creates an undesirable dark and light pattern in the screen, and particularly hinders to realization of a high quality display having a large area.

It is an object of the present invention to provide a liquid crystal display which is capable of decreasing variations in the effective values of the driving voltages respectively applied to pixels, which depend upon the content displayed on a liquid crystal panel, decreasing crosstalk and obtaining uniform brightness.

SUMMARY OF THE INVENTION

In order to achieve the object, a compensating voltage for sharpening at least one of the rounded front edge and rear edge of the waveform of a voltage, which is used for driving a liquid crystal in a linear sequence, or a compensating voltage for masking the distortion of the waveform of the liquid crystal driving voltage by constantly changing the waveform, is superimposed on at least one of an X electrode driving circuit and a Y electrode driving circuit.

In order to achieve the object, the present invention provides a liquid crystal display comprising a liquid crystal matrix panel for displaying information, the array having liquid crystal units which are arranged in a matrix and to which driving voltages are respectively applied from X strip electrodes and Y strip electrodes, a driving circuit for supplying driving voltages to the X electrodes, a driving circuit for supplying driving voltages to the Y electrodes, and a circuit for superimposing a compensating voltage for sharpening at least one rounded front edge and rear edge of the waveform of a liquid crystal driving voltage or a compensating voltage for masking the distortion of the waveform of the liquid crystal driving voltage by constantly changing the waveform thereof on at least one of the X electrode driving circuit and the Y electrode driving circuit.

In the present invention, the compensating voltage superimposed on the linear sequence driving voltage has the function of alleviating the effect of distortion in the waveform of each driving voltage, which depends upon the content displayed on the liquid crystal panel, and decreases the variations in the effective values of the driving voltages respectively applied to the pixels, resulting in a decrease in crosstalk.

The present invention also provides a liquid crystal display comprising a liquid crystal matrix panel for displaying information having liquid crystal units, which are arranged in a matrix and to which driving voltages are respectively applied from X strip electrodes and Y strip electrodes, a driving circuit for supplying driving voltages to the X electrodes, a driving circuit for supplying driving voltages to the Y electrodes, a power circuit for supplying reference voltages to the X electrode driving circuit and the Y electrode driving circuit, and a circuit for superimposing a compensating voltage for sharpening at least one of the rounded front edge and rear edge of the waveform of each liquid crystal driving voltage or a compensating voltage for masking the distortion of each liquid crystal driving voltage by constantly changing the waveform thereof on at least one of the X electrode driving circuit, the Y electrode driving circuit and the power circuit.

In either of the above liquid crystal displays, the circuit for superimposing the compensating voltage is a circuit for superimposing the compensating voltage on at least one of the rising and falling portions of each driving voltage or a circuit for constantly superimposing the compensating voltage on each driving voltage.

When the power circuit for the driving voltages outputs a plurality of reference voltages, the circuit for superimposing the compensating voltage is a circuit for superimposing the compensating voltage on at least one of the reference voltages and selecting the reference voltages on which the compensating voltage is superimposed or a circuit for selecting one voltage from a plurality of reference voltages and then superimposing the compensating voltage on the selected reference voltage.

DETAILED OF THE PREFERRED EMBODIMENTS

Embodiments of the present invention are described below with reference to the drawings.

Figure 1A:
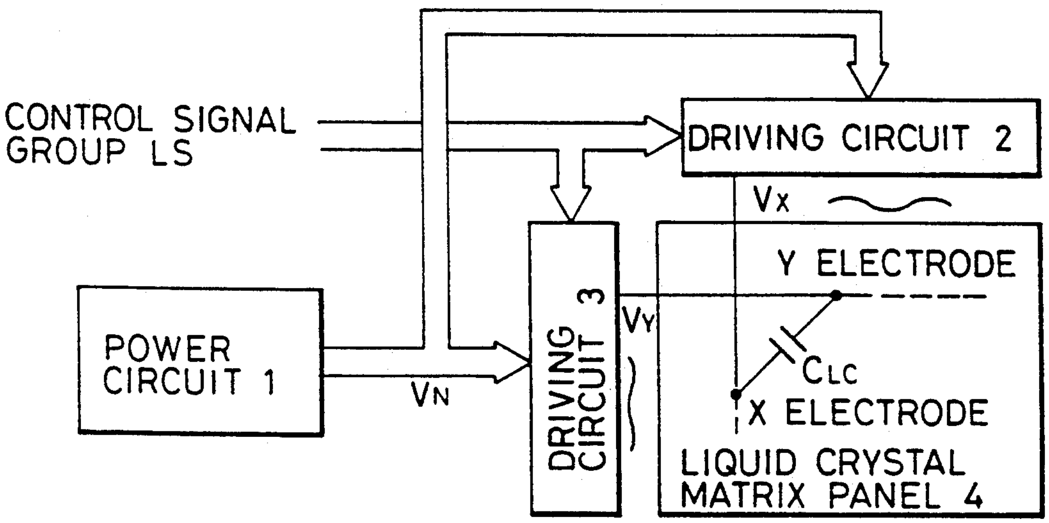
FIG. 1 (A) is a block diagram of the arrangement of a basic embodiment of a liquid crystal display in accordance with the present invention and FIG. 1 (B) is a time chart which shows the waveform of the voltage applied to a single pixel in the embodiment.

FIG. 1 (A) shows the arrangement of a basic embodiment of a liquid crystal display in accordance with the present invention, and FIG. 1 (B) shows the waveform of a voltage applied to a single pixel in the embodiment. In the liquid crystal matrix panel 4 of the liquid crystal display shown in FIG. 1A, electrodes and Y electrodes intersect each other to form pixels. A driving circuit 2 connected to the X electrodes and a driving circuit 3 connected to the Y electrodes output driving voltages $V_x$ and $V_y$ respectively. The difference $V_x - V_y$ of the voltages is applied to each of the pixels for the purpose of driving the liquid crystal. The driving circuits 2 and 3, which are controlled by a control signal group LS, combine several reference voltages $V_N$ output from the power circuit 1 to form the driving voltages $V_x$ and $V_y$ respectively.

In the above liquid crystal display, the power circuit 1, the driving circuit 2 and the driving circuit 3 have functions to superimpose a compensating voltage for masking the distortion of a driving voltage by constantly changing the waveform thereof on the reference voltages $V_N$, the driving voltages $V_x$ and the driving voltages $V_y$ respectively. The functions cause the resultant superimposed voltage shown in FIG. 1 (B) to be applied to each of the pixels. The resultant superimposed voltage can alleviate the effect of the waveform distortion of each driving voltage on a single pixel, which depends upon the content displayed on the liquid crystal panel. The superimposed voltage can also decrease variations in the effective values of the driving voltages applied to the pixels.

This embodiment permits a decrease in variations of the effective values of the driving voltages applied to the pixels, which depends upon the content displayed on the liquid crystal panel, as described in detail below. As a result, crosstalk is decreased, and uniform brightness is obtained. This leads to the achievement of a high quality display.

Figure 1B:
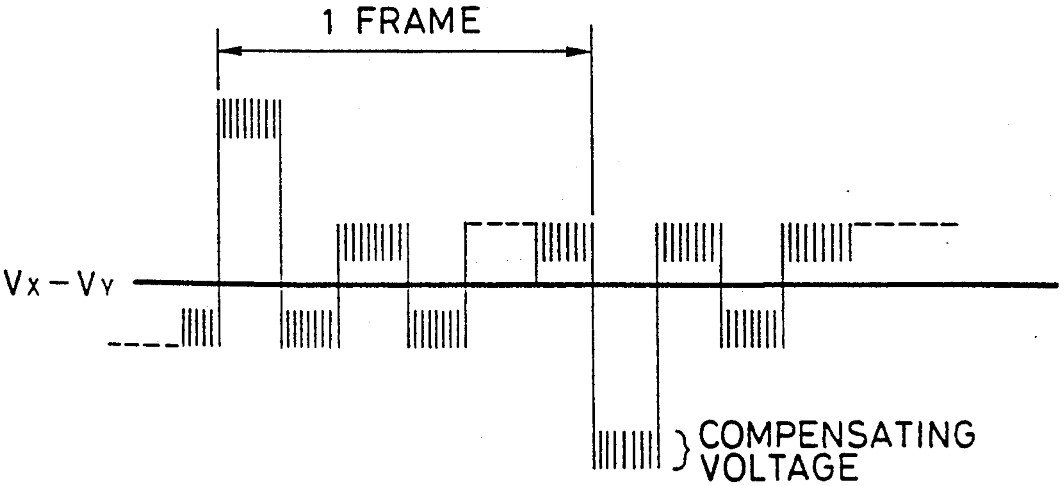

The shape, period, amplitude and the application time of the waveform of the compensating voltage superimposed, which is simplified and shown in FIG. 1(B), can be set to any desired values.

Figure 2:
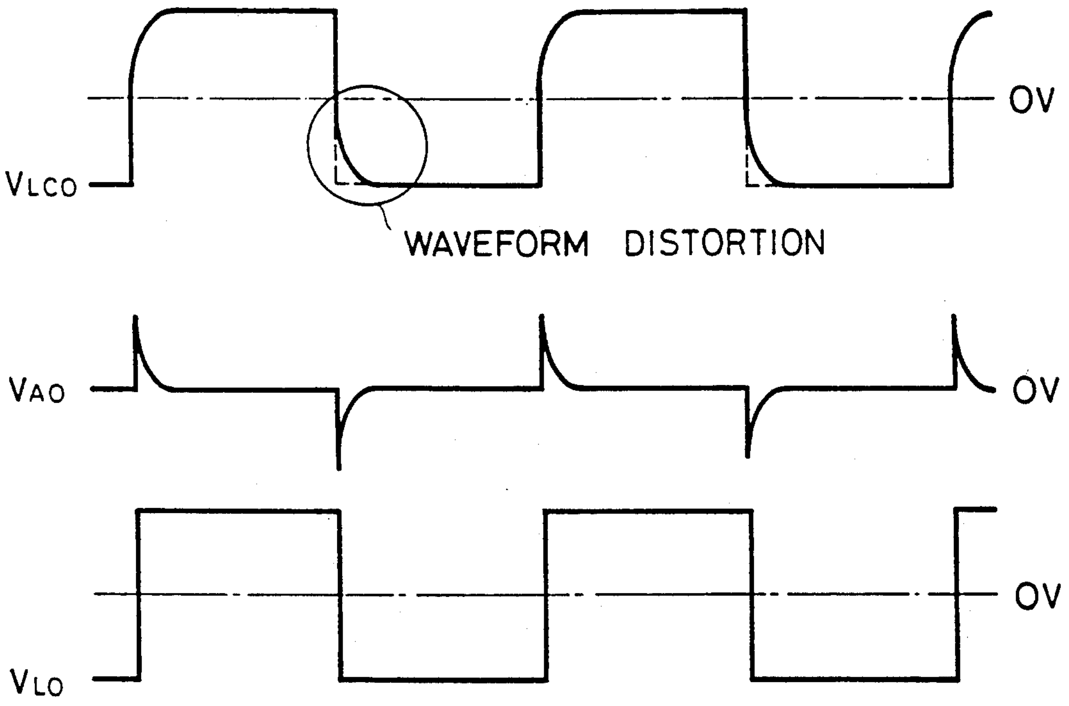
FIG. 2 is a time chart which shows an example of the method of superimposing a compensating voltage on a driving voltage in the embodiment shown in FIG. 1.

FIG. 2 shows an example of the method of superimposing the compensating voltage on each driving voltage in the embodiment shown in FIG. 1. The liquid crystal driving voltages are generally affected by the R-C circuit formed by the resistors and the capacitors involved in the liquid crystal panel, the driving circuits and the power circuit to produce the waveform distortion shown by a voltage waveform $V_{LCO}$ in FIG. 2. A voltage waveform $V_{AO}$ is a voltage corresponding to the voltage difference between an ideal liquid crystal driving voltage and the voltage waveform $V_{LCO}$, i.e., the waveform distortion. The voltage waveform obtained by superimposing as a compensating voltage the voltage waveform $V_{AO}$ on the voltage waveform $V_{LCO}$ is shown by $V_{LO}$ and is an ideal liquid crystal driving voltage waveform.

This embodiment permits the driving voltages of the same effective value to be applied to the pixels having the same brightness data without producing any distortion in the liquid crystal driving voltages and uniform brightness to be obtained. Namely, the embodiment prevents the occurrence of crosstalk and inhibits variations in contrast.

Figure 3:
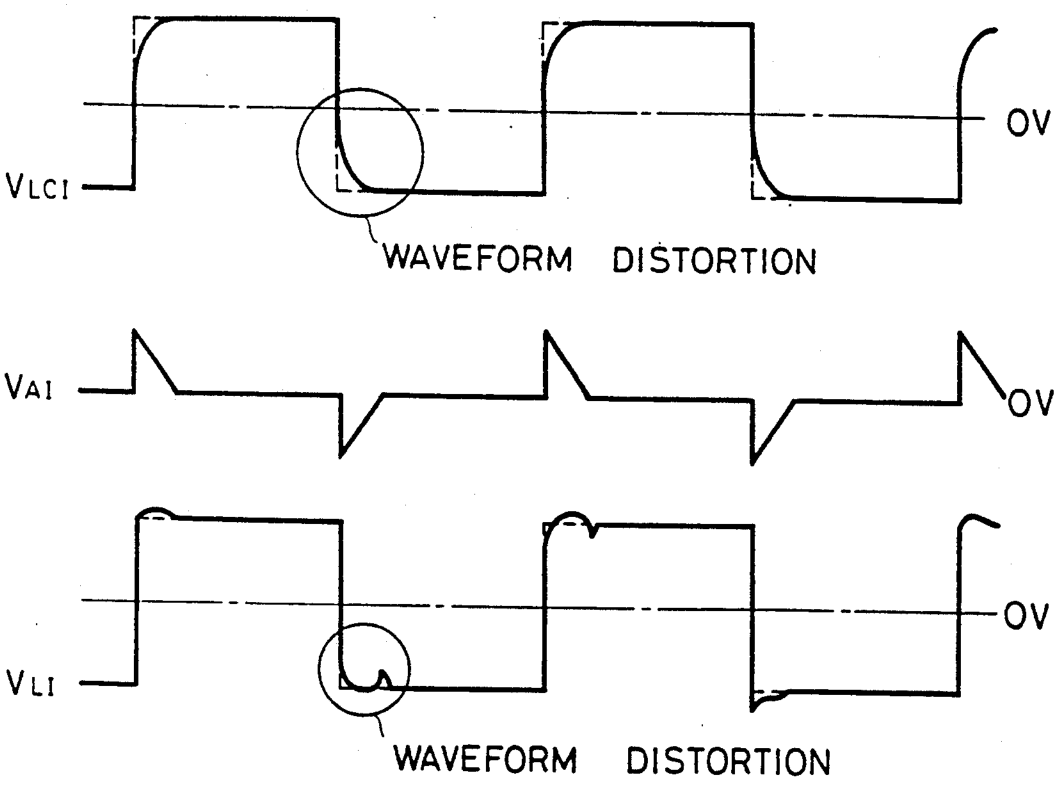
FIG. 3 is a time chart which shows another example of the method of superimposing a compensating voltage on a driving voltage in the embodiment shown in FIG. 1.

FIG. 3 shows another example of the method of superimposing the compensating voltage on each driving voltage in the embodiment shown in FIG. 1. The waveform of each of the liquid crystal driving voltages is distorted by the effect of the R-C circuit involved in the components of the liquid crystal panel, the driving circuits, the power circuit and the like when they are driven, as shown by a voltage waveform $V_{LC1}$ in FIG. 3. A voltage waveform $V_{A1}$ is the voltage waveform obtained by simulating the main waveform distortion in the voltage of difference between an ideal liquid crystal driving voltage and the voltage waveform $V_{LC1}$, i.e., the voltage corresponding to the waveform distortion. When the voltage waveform $V_{A1}$ is superimposed as a compensating voltage on the voltage waveform $V_{LC1}$, a voltage waveform $V_{L1}$ is formed. Since the waveform distortion of the liquid crystal driving voltage $V_{LC1}$ depends upon the number and kinds of the characters displayed on the liquid crystal panel, the waveform distortion of the driving voltage $V_{L1}$ resulting from the superimposition of the compensating voltage $V_{A1}$ is incompletely removed. However, the waveform distortion can be significantly decreased, as compared with the original voltage waveform $V_{LC1}$.

This embodiment permits a decrease in distortion of each liquid crystal driving voltage, a decrease in variations of the effective values of the liquid crystal driving voltages applied to the pixels having the same brightness data and a decrease in variations in brightness. It is therefore possible to prevent the occurrence of crosstalk.

The compensating voltage $V_{A1}$ shown in FIG. 3 is only an example, and the present invention is not limited to this. Namely, the shape, period, amplitude, application time and the like of the waveform of the compensating voltage can be changed within a range in which the objects of the present invention can be achieved, according to the states of waveform distortion of the liquid crystal driving voltages.

Figure 4:
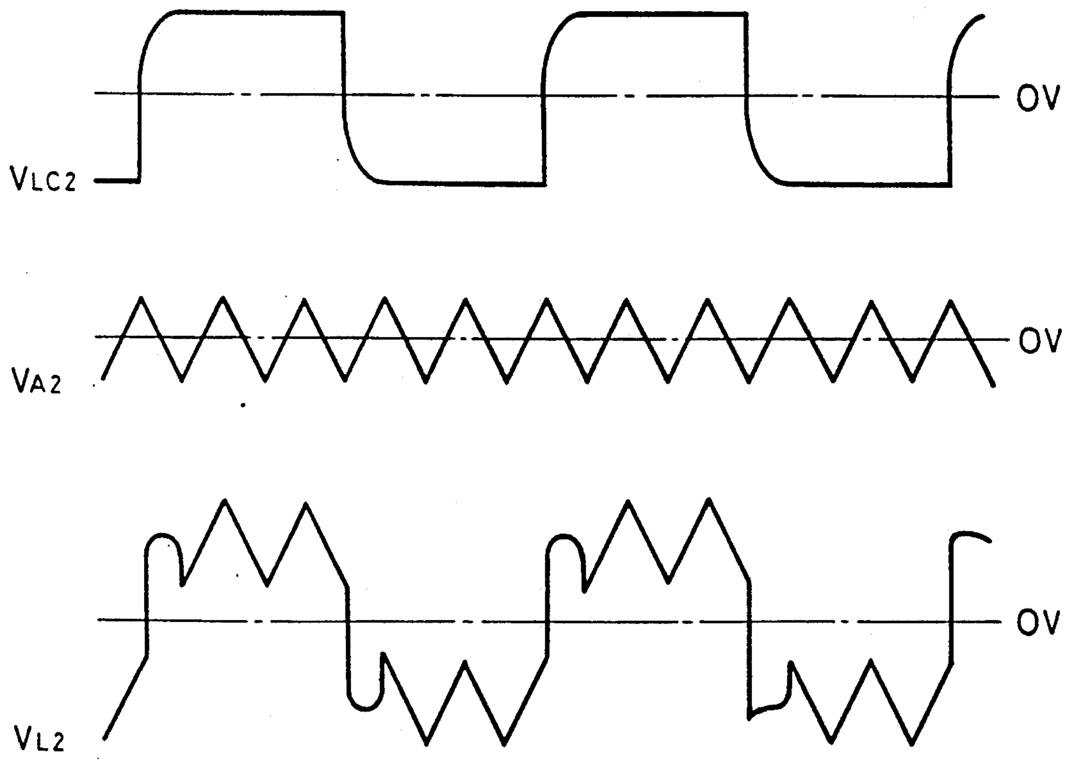
FIG. 4 is a time chart which shows a further example of the method of superimposing a compensating voltage on a driving voltage in the embodiment shown in FIG. 1.

FIG. 4 shows a further method of superimposing the compensating voltage on each driving voltage in the embodiment shown in FIG. 1. The waveform of each of the liquid crystal driving voltages is distorted by the effect of the R-C circuit involved in the components of the liquid crystal panel, the driving circuits, the power circuit when they are driven, as shown by a voltage waveform $V_{LC2}$ in FIG. 4. The waveform distortion depends upon the content displayed on the liquid crystal panel and creates variations in the effective values of the voltages actually applied to the pixels. This consequently causes the occurrence of crosstalk.

A voltage waveform $V_{A2}$ is a compensating voltage superimposed on a liquid crystal driving voltage $V_{LC2}$, and a voltage waveform $V_{L2}$ is the liquid crystal driving voltage waveform obtained by superimposing the voltage waveform $V_{A2}$ on the voltage waveform $V_{LC2}$.

The application of the compensating voltage $V_{A2}$ permits a decrease in the effect of variation in the waveform distortion shown in the liquid crystal driving voltage $V_{LC2}$ on variation in the effective value of the voltage waveform $V_{L2}$, and a decrease in variations in the effective values, which depends upon the content displayed.

This embodiment permits a decrease in the effect of waveform distortion of each liquid crystal driving voltage, which depends upon the content displayed on the liquid crystal panel, on the variations in the effective values of the actual liquid crystal voltages. It is therefore possible to decrease the variations in the effective values of the liquid crystal driving voltages applied to the pixels having the same brightness data and prevent the occurrence of crosstalk.

The applied voltage $V_{A2}$ shown in FIG. 4 is only an example, and the present invention is not limited to this. Namely, the shape, period, amplitude, application time and the like of the waveform of the compensating voltage can be changed within a range in which the effect of the invention can be obtained, according to the states of waveform distortion of the liquid crystal driving voltages. The compensating voltage $V_{A2}$ may be a voltage for masking the waveform distortion of a liquid crystal driving voltage by constantly changing the waveform thereof. The compensating voltage is not always required to have periodicity.

Figure 5:
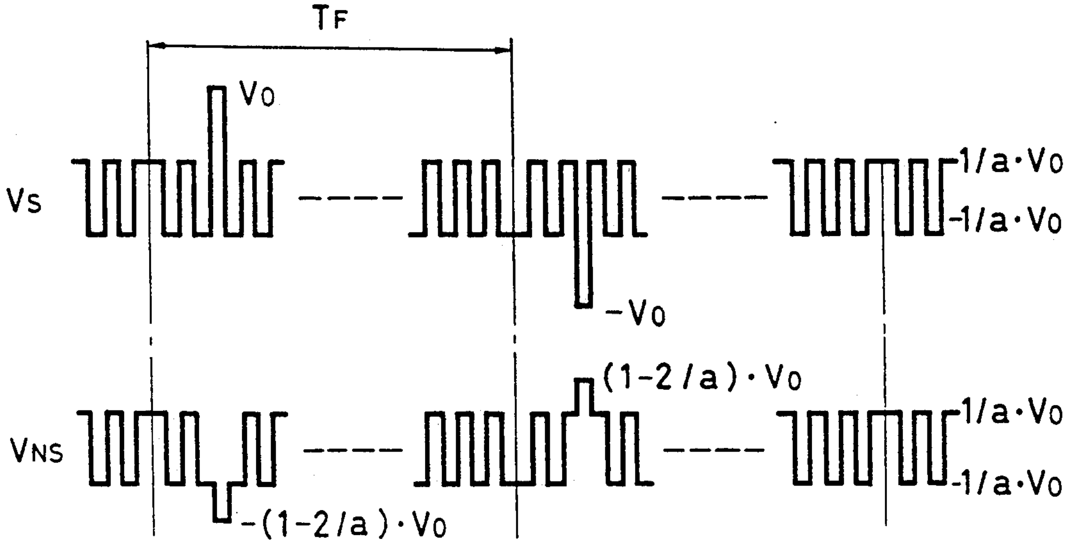
FIG. 5 is a time chart which shows a general method of driving a liquid crystal using a frame inversion method.
Figure 6:
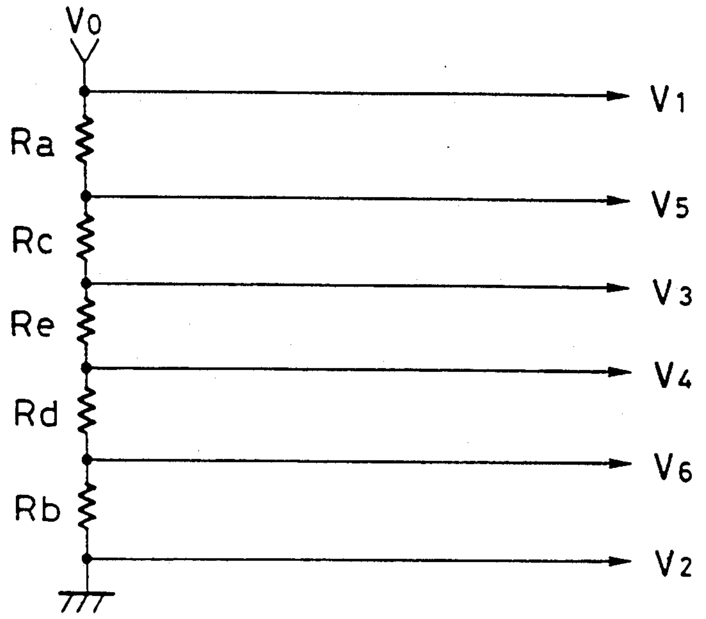
FIG. 6 is a drawing of an example of the arrangement of a power circuit which uses a voltage divider for obtaining a plurality of reference voltages.

FIG. 5 shows a general method of driving a liquid crystal by a frame inversion method. A voltage $V_S$ is the driving voltage applied to the pixel at the selected point, and a voltage $V_{NS}$ is the driving voltage applied to the pixel at the unselected point. $T_F$ denotes the period of one frame, and the display of one pixel is finished in one frame. In order to make the driving voltages applied to the liquid crystal alternate, the polarity is inverted in the next frame. The selected point driving voltage $V_S$ and the unselected point voltage $V_{NS}$ comprise voltage $\pm V_o$, $\pm V_o/a$ and $\pm(1+2/a)V_o$ wherein a denotes a bias ratio. The voltages are denoted by, for example, the voltage differences between the reference voltages $V_1$ to $V_6$ which are determined by the voltage dividing resistors Ra to Re and the liquid crystal driving voltage $V_o$ of the power circuit shown in FIG. 6.

Figure 7:
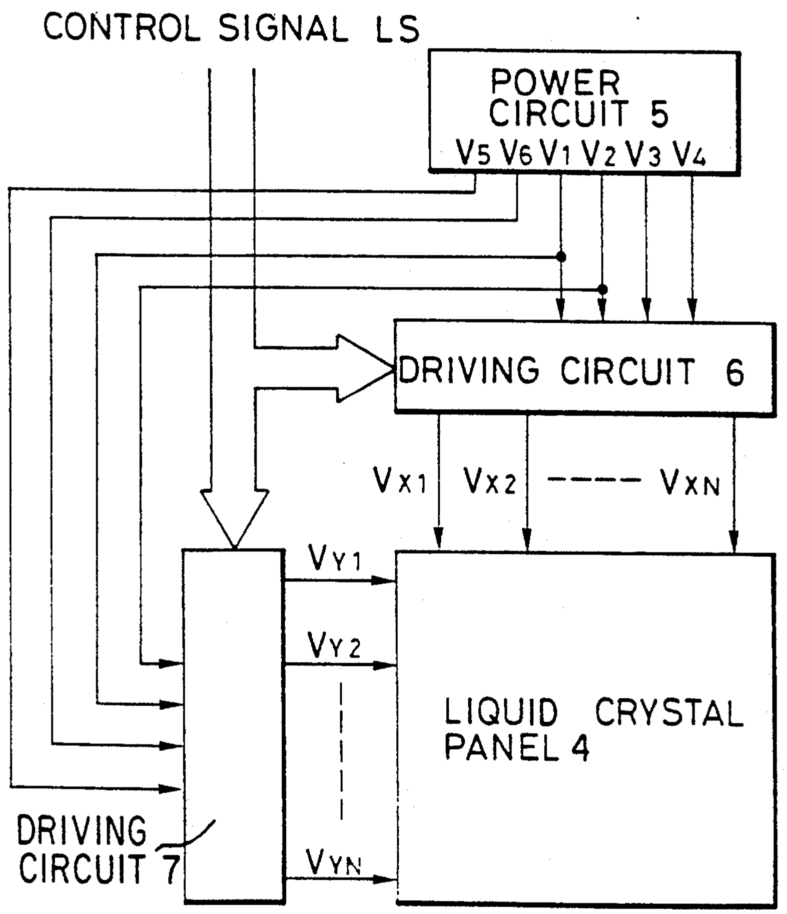
FIG. 7 is a block diagram of the arrangement of an embodiment of a liquid crystal display.

FIG. 7 shows a typical example of the configuration of the liquid crystal display. The reference voltages $V_1$ to $V_6$, which are established in a power circuit 5, are input to a X electrode driving circuit 6 and a Y electrode driving circuit 7. When the driving circuits 6, 7 receive control signals LS from the outside, the driving circuits 6, 7 select voltages from the reference voltages $V_1$ to $V_6$ in a time division manner, combine them and output liquid crystal driving voltages $V_{X1}$, $V_{X2}$, . . . , $V_{XN}$, $V_{Y1}$, $V_{Y2}$, . . . , $V_{YN}$. The voltages are output to the liquid crystal panel 4 and respectively applied to the pixels, as shown by the liquid crystal driving voltages in FIG. 5.

A method is required for performing the driving method of the present invention in which the compensating voltages are respectively superimposed on the liquid crystal voltages. This superimposing method is roughly divided into two types. In one type, the compensating voltage waveforms are applied to the reference voltages $V_1$ to $V_6$, and, in the other type, the compensating voltages are applied to the liquid crystal driving voltages $V_{X1}, V_{X2}, \ldots, V_{XN}, V_{Y1}, V_{Y2}, V_{YN}$.

Figure 8:
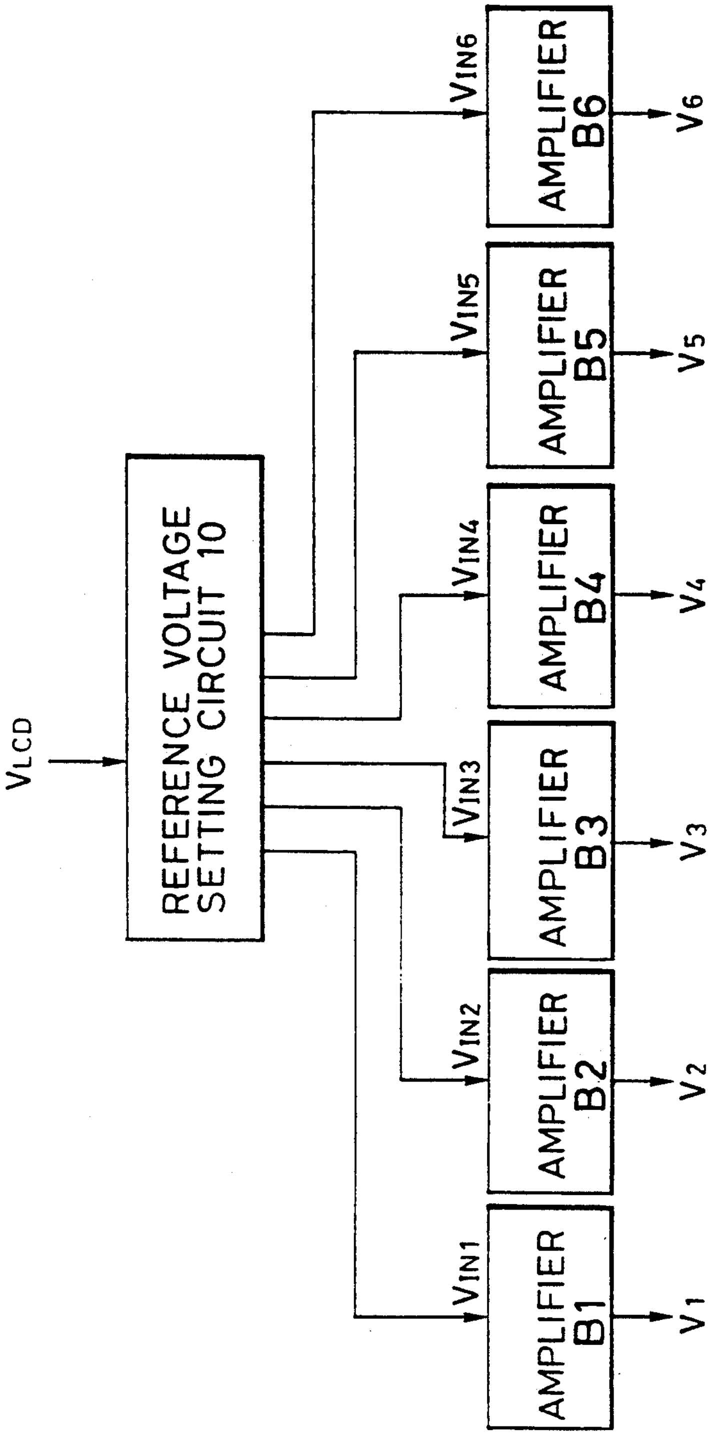
FIG. 8 is a block diagram of an example of the arrangement of the power circuit of the liquid crystal display shown in FIG. 7.

FIG. 8 shows an example of the arrangement of the power circuit of the liquid crystal display shown in FIG. 7. A reference voltage setting circuit 10 comprises, for example, the voltage dividing resistors shown in FIG. 6 so as to divide the liquid crystal driving power voltage $V_{LCD}$ to form reference voltages $V_{IN1}$ to $V_{IN6}$. Amplifiers $B_1$ to $B_6$ are power amplifiers for the reference voltages $V_{IN1}$ to $V_{IN6}$, respectively, and, for example, operational amplifiers are used as voltage followers. The reference voltages $V_1$ to $V_6$ respectively output from the amplifiers $B_1$ to $B_6$ are used as voltages for driving the liquid crystal.

In the driving method of the present invention, the method of superimposing the compensating voltages on the voltages output from the power circuit can be realized by using a circuit for applying the compensating voltages on any of the liquid crystal driving power voltage $V_{LCD}$, the reference voltages $V_{IN1}$ to $V_{IN6}$ and the reference voltages $V_1$ to $V_6$.

In the power circuit shown in FIG. 8, in some cases, any one of the amplifiers $B_1$ to $B_6$ is removed so that the output from the reference voltage setting circuit 9 is directly used as the output from the power circuit.

Figure 9:
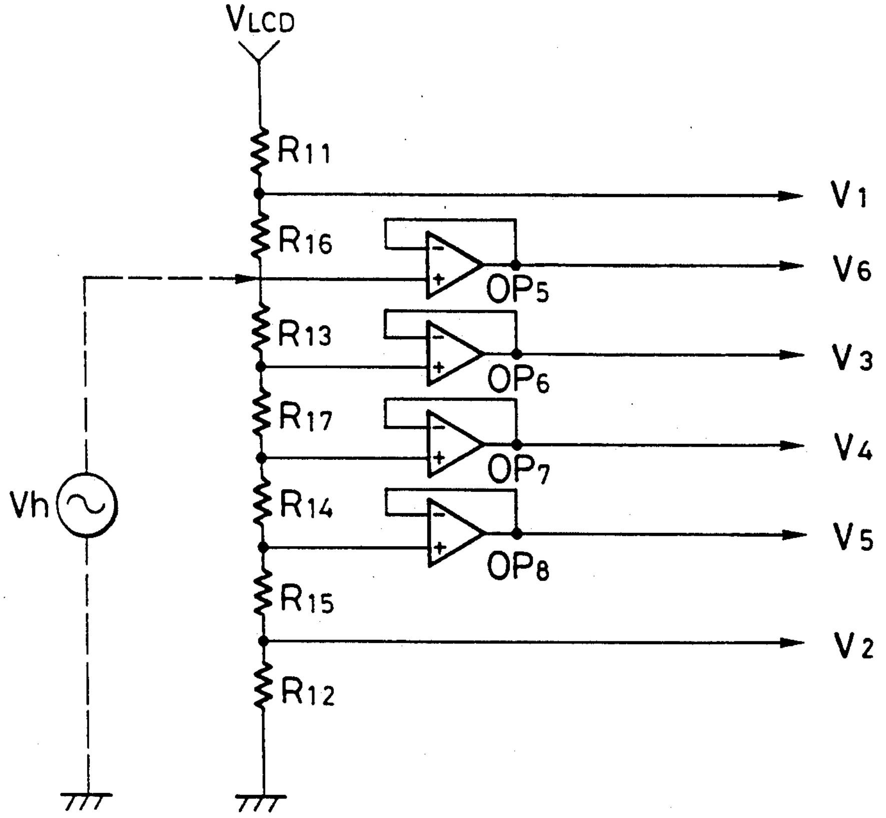
FIG. 9 is a drawing of a circuit which shows the arrangement of an embodiment in which a compensating voltage is superimposed in the resistance part of a voltage divider.

FIG. 9 shows a typical embodiment of an arrangement for superimposing a compensating voltage in the resistor part of the voltage divider. The liquid crystal driving power voltage $V_{LCD}$ is divided by resistors $R_{11}$ to $R_{17}$ to form the reference voltages $V_1$ to $V_6$. Amplifiers $OP_5$ to $OP_8$ are power amplifiers for the reference voltages formed by the voltage dividing resistors, and operational amplifiers are used as voltage followers. $V_h$ denotes a compensating voltage for sharpening at least one of the rounded front edge and rear edge of the waveform of a liquid crystal driving voltage or a compensating voltage for masking the distortion of waveform of a liquid crystal driving voltage by constantly changing the waveform thereof. The compensating voltage is applied between the resistors $R_{16}$ and $R_{13}$.

Figure 10:
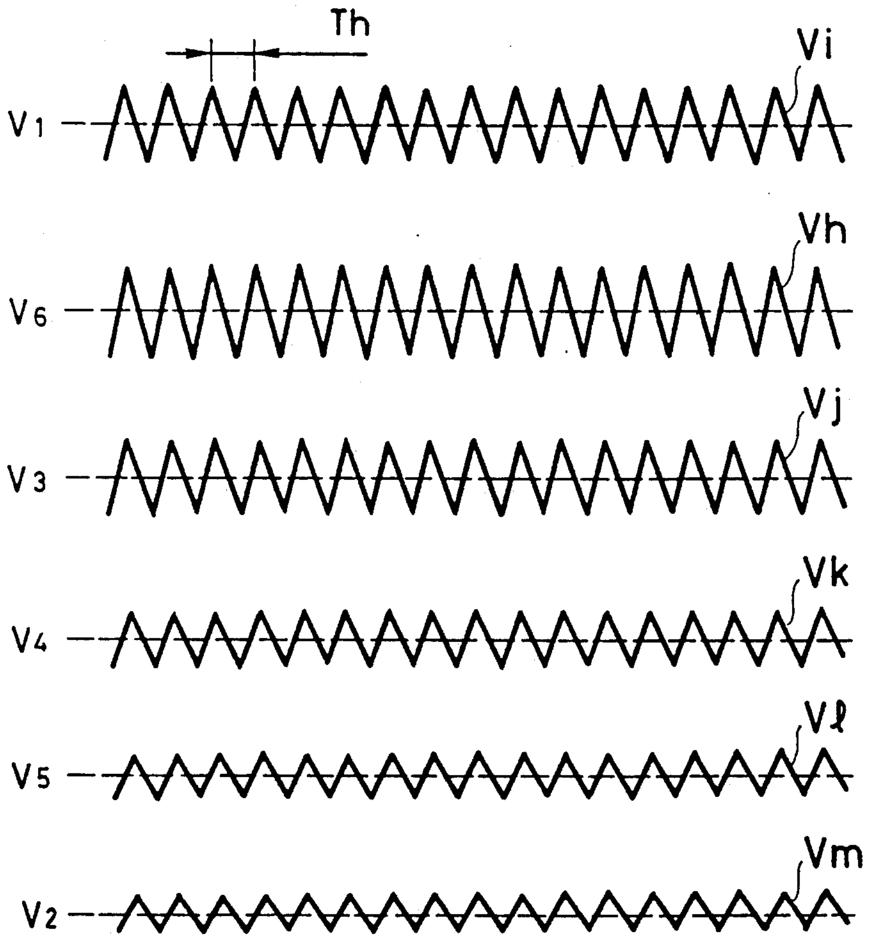
FIG. 10 is a time chart which shows examples of the waveform of the compensating voltage in the embodiment shown in FIG. 9.

FIG. 10 shows examples of the waveform of the compensating voltage in the embodiment shown in FIG. 9. A chopping wave having a period of $T_h$ is added as the compensating voltage $V_h$. Voltage waveforms $V_h$ to $V_m$ of chopping waves are thus superimposed, as shown by the reference voltages $V_1$ to $V_6$ in FIG. 10.

Figure 11:
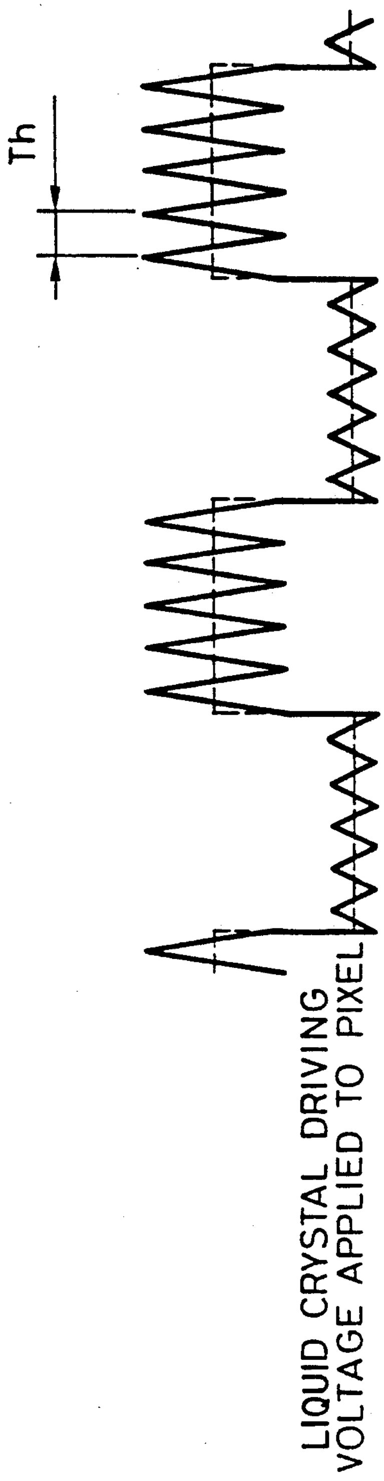
FIG. 11 is a time chart which shows an example of the waveform of the liquid crystal driving voltage obtained by superimposing some of the voltage waveforms shown in FIG. 10.

FIG. 11 shows an example of the waveform of the liquid crystal driving voltage which is obtained by the power circuit in the embodiment shown in FIGS. 9 and 10 which is applied to each of the pixels. The compensating voltage $V_h$ is superimposed on each of the liquid crystal driving voltages so as to reduce the effect of waveform distortion which causes the occurrence of crosstalk.

The power circuit in this embodiment permits a decrease in the effect of waveform distortion of each liquid crystal driving voltage, which depends upon the content displayed on the liquid crystal panel, on variations in the effective values of the liquid crystal driving voltages. It is therefore possible to decrease variations in the effective values of the liquid crystal driving voltages applied to the pixels having the same brightness data, decrease variations in brightness and prevent the occurrence of crosstalk.

The compensating voltage $V_h$ shown in FIGS. 9 and 10 is only an example, and the present invention is not limited to them. The shape, period, amplitude and application time of the waveform of the compensating voltage can be changed within a range in which the effect of the invention can be obtained, according to the waveform distortion of the liquid crystal driving voltages. The compensating voltage $V_h$ may be a voltage for masking the waveform distortion of a liquid crystal driving voltage by constantly changing the waveform thereof. The compensating voltage need not always have periodicity. The compensating voltage $V_h$ may be applied to any point between the voltage dividing resistances $R_{11}$ to $R_{17}$, the input terminal to which the liquid crystal driving power voltage $V_{LCD}$ applied, between the resistor $R_{12}$ and a common voltage. Alternatively, the compensating voltage $V_h$ may be applied to a plurality of points. The means for applying the compensating voltage is not particularly limited.

Figure 12:
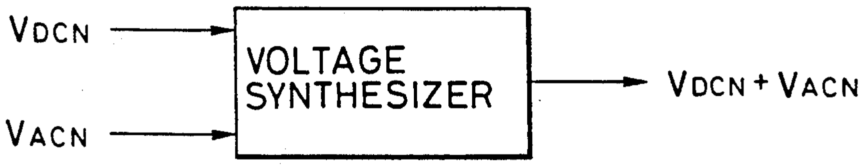
FIG. 12 is a block diagram of the arrangement of a basic circuit for superimposing a compensating voltage on each reference voltage of a power circuit.
Figure 13:
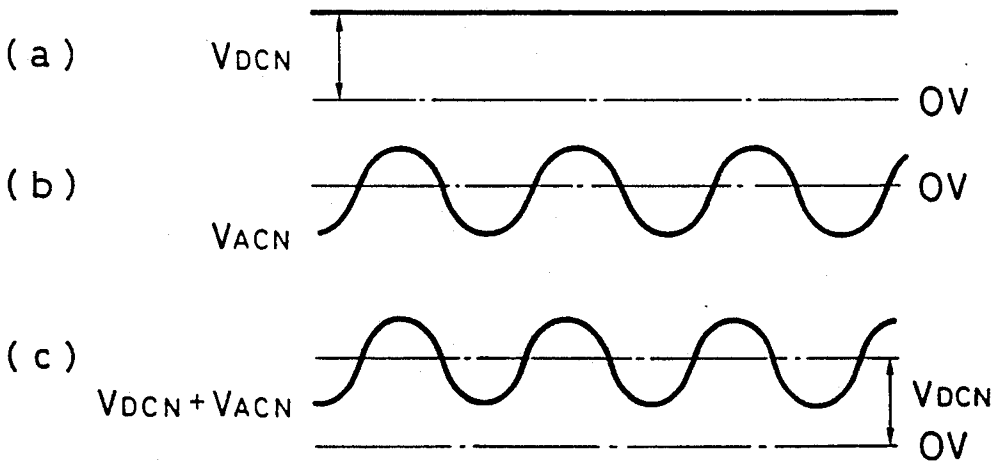
FIG. 13 is a time chart which shows an example of the voltage waveform of each part in the basic circuit shown in FIG. 12.

FIG. 12 shows the arrangement of a basic circuit for superimposing the compensating voltage on each of the reference voltages in the power circuit. FIG. 13 shows an example of the voltage waveform in each part of the basic circuit shown in FIG. 12. In the drawings, $V_{DCN}$ denotes each of the reference voltages, and $V_{ACN}$ denotes the compensating voltage. Both voltages are combined by a circuit or an element which serves as an adder such as an operational amplifier, a capacitor or the like to form a voltage in which the compensating voltage $V_{ACN}$ is superimposed on each of the reference voltages $V_{DCN}$, as shown in FIG. 13(*c*). If two circuits do not interact with each other and an intended superimposed voltage can be obtained, a buffering circuit may be removed so that the voltages $V_{DCN}$ and $V_{ACN}$ are directly combined.

Figure 14:
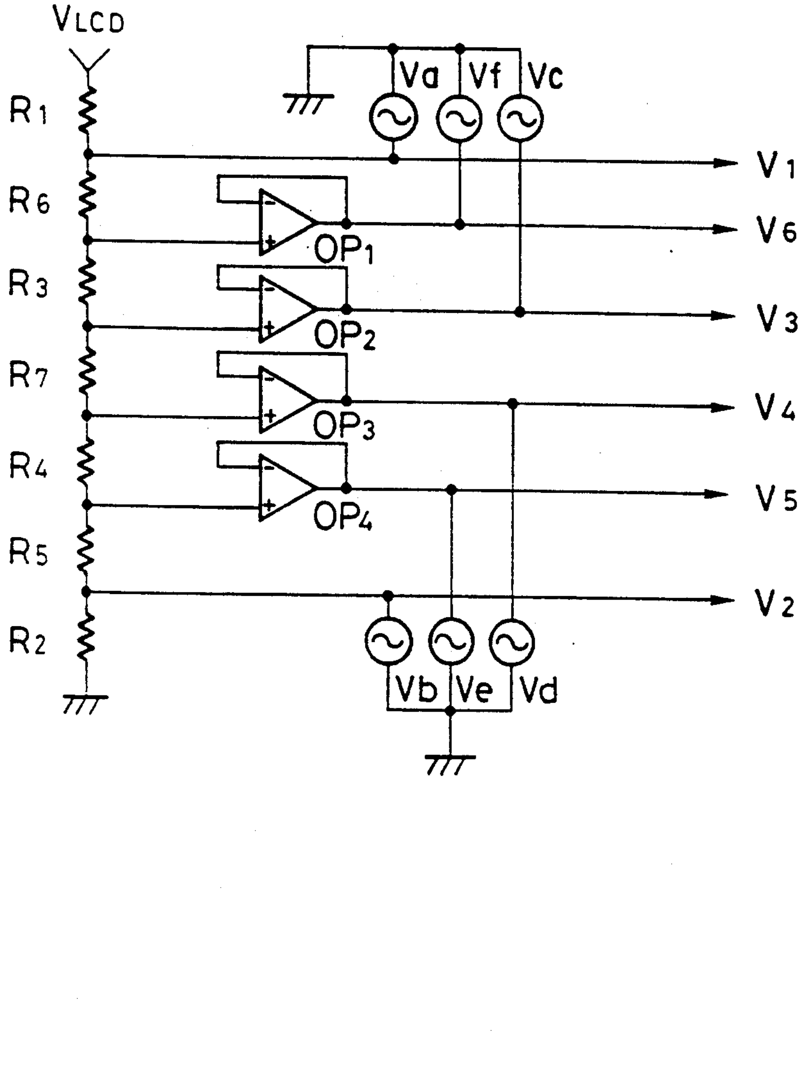
FIG. 14 is a drawing of a circuit in an embodiment of the basic circuit shown in FIG. 12.

FIG. 14 shows a typical embodiment of the basic circuit shown in FIG. 12. In the drawing, resistors $R_1$ to $R_7$ are voltage dividing resistors for dividing the liquid crystal driving power voltage $V_{LCD}$. The liquid crystal driving voltage $V_{LCD}$ is divided by the resistors $R_1$ to $R_7$ to form reference voltages $V_1$ to $V_6$. Operational amplifiers $OP_1$ to $OP_4$ are power amplifiers for the reference voltages formed by the voltage dividing resistors $R_1$ to $R_7$ and serve as voltage followers. $V_a$ to $V_f$ denotes voltage sources for outputting compensating voltages to be superimposed on the reference voltages $V_1$ to $V_6$, respectively.

Figure 15:
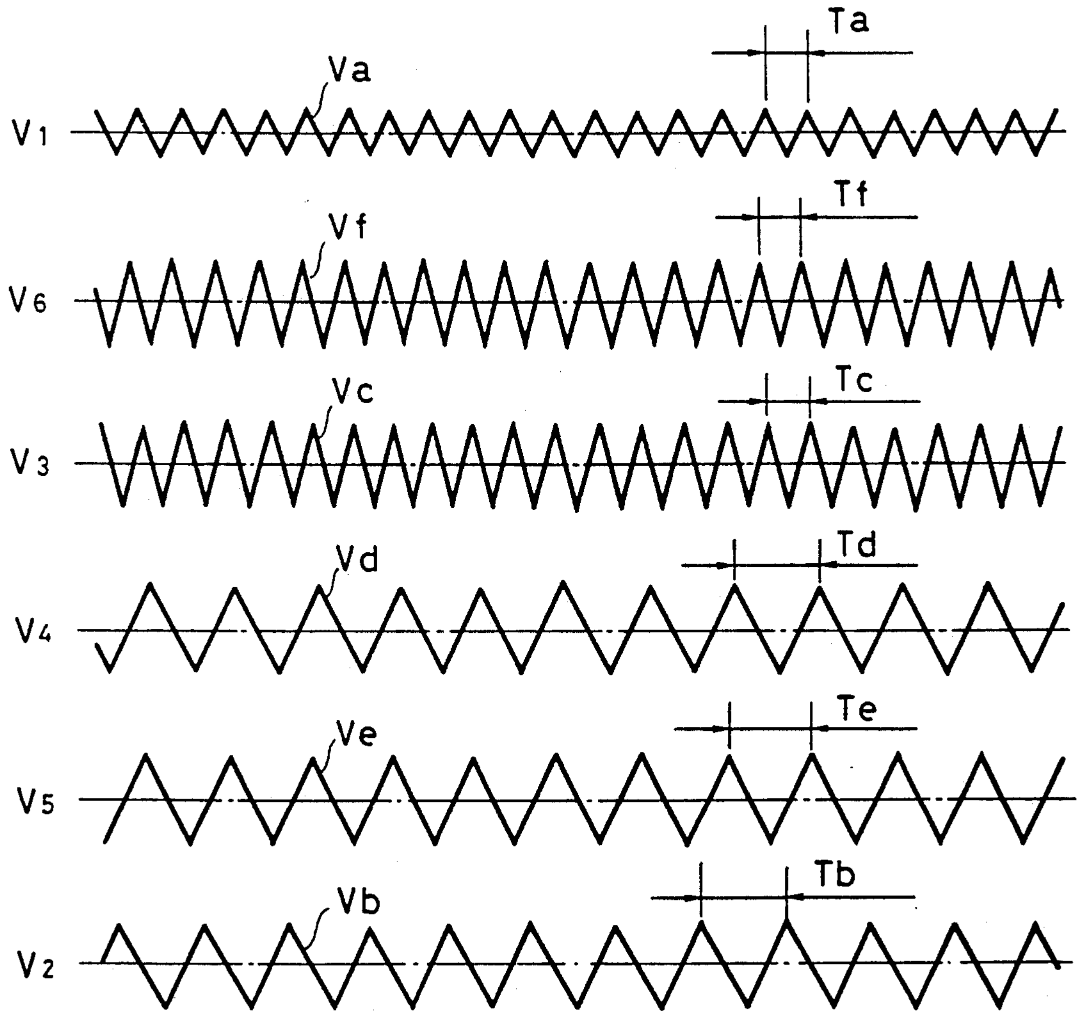
FIG. 15 is a time chart which shows an example of the voltage waveform in each part of the embodiment shown in FIG. 14.

FIG. 15 shows the voltage waveforms of the compensating voltages $V_a$ to $V_f$ which are respectively superimposed on the reference voltages $V_1$ to $V_6$. $T_a$ to $T_f$ denote the periods of the compensating voltages $V_a$ to $V_f$, respectively. The compensating voltages $V_a$ to $V_f$ are asynchronous. Some of the voltages obtained by respectively superimposing the compensating voltages $V_a$ to $V_f$ on the reference voltages $V_1$ to $V_6$ are combined in a driving circuit to form liquid crystal driving voltages.

Figure 16:
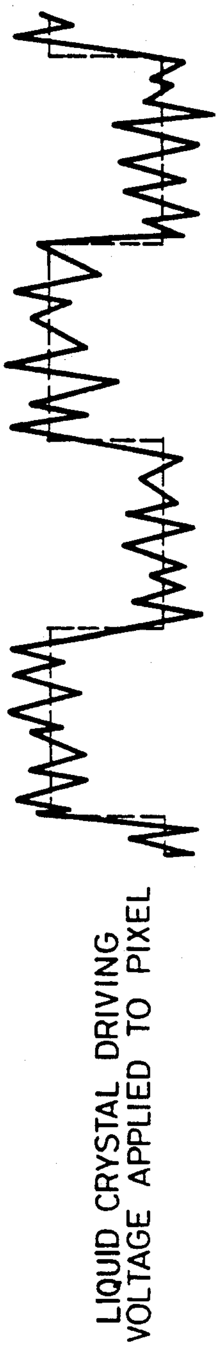
FIG. 16 is a time chart which shows an examples of the waveform of the liquid crystal driving voltage obtained by composing some of the voltage waveforms shown in FIG. 15.

FIG. 16 shows an example of the waveforms of the liquid crystal driving voltages obtained by superimposing some of the voltage waveforms shown in FIG. 15. Any desired compensating voltage can be superimposed on the liquid crystal driving voltages by the compensating voltage sources $V_a$ to $V_f$ so that the effect of variations in waveform distortion, which causes the occurrence of crosstalk, can be reduced.

The power circuit in this embodiment permits a decrease in the effect of waveform distortion of a liquid crystal driving voltage, which depends upon the content displayed on the liquid crystal panel, on variations in the effective values of the driving voltages. It is therefore possible to decrease variations in the effective values of the liquid crystal voltages applied to the pixels having the same brightness data, decrease variations in brightness and prevent the occurrence of crosstalk.

The compensating voltages $V_a$ to $V_f$ shown in FIG. 15 are only examples, and the present invention is not limited to them. The shape, period, amplitude and application time of the waveform of each of the compensating voltages can be changed within a range in which the effect of the invention can be obtained, according to the states of the waveform distortion of the liquid crystal driving voltages. Each of the compensating voltages $V_a$ to $V_f$ may be a voltage for sharpening at least one of the rounded front edge of rear edge of the waveform of a liquid crystal driving voltage or a voltage for masking the waveform distortion of a liquid crystal driving voltage by constantly changing the waveform thereof. The compensating voltages need not always have periodicity. The compensating voltages need not be superimposed on all the reference voltages of the power circuit. The compensating voltages may be superimposed on any of the reference voltages within a range in which the effect of the invention can be obtained.

Figure 17:
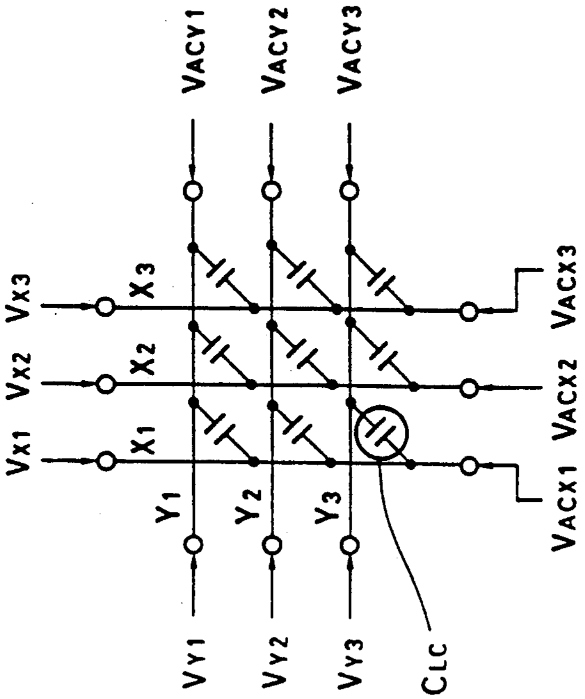
FIG. 17 is a drawing of a basic arrangement of wiring in a driving system for respectively applying compensating voltages to the electrodes of a liquid crystal panel.

FIG. 17 shows the basic arrangement of a driving circuit for superimposing any desired compensating voltages on the liquid crystal driving voltages by applying the compensating voltages to the electrodes of the liquid crystal panel in a 3×3 matrix liquid crystal panel. $C_{LC}$ denotes a load on each pixel in the liquid crystal panel, $X_1$ to $X_3$ each denote an X electrode, and $Y_1$ to $Y_3$ each denote a Y electrode. The voltages obtained by superimposing compensating voltages $V_{ACX1}$ to $V_{ACX3}$ on driving voltages $V_{X1}$ to $V_{X3}$ of the X electrode driving circuit are respectively applied to the X electrodes $X_1$ to $X_3$. The voltages obtained by superimposing compensating voltages $V_{ACY1}$ to $V_{ACY3}$ on driving voltages $V_{Y1}$ to $V_{Y3}$ of the Y electrode driving circuit are respectively applied to the Y electrodes $Y_1$ to $Y_3$. The voltage difference between the voltages applied to each X electrode and each Y electrode is applied to each of the pixels of the liquid crystal panel so that any compensating voltages can be superimposed on the liquid crystal driving voltages.

Figure 18:
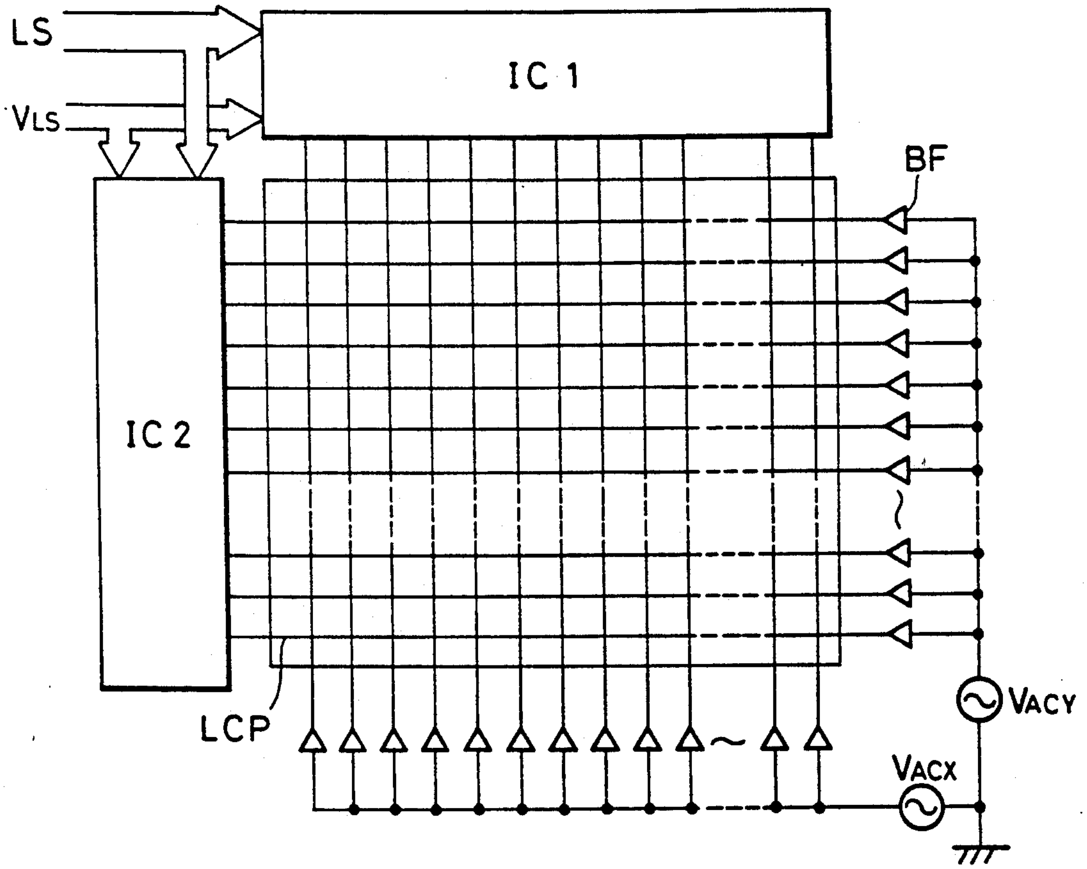
FIG. 18 is a drawing of an embodiment of the driving circuit for the liquid crystal panel shown in FIG. 17 which comprises IC and buffer amplifiers.
Figure 19:
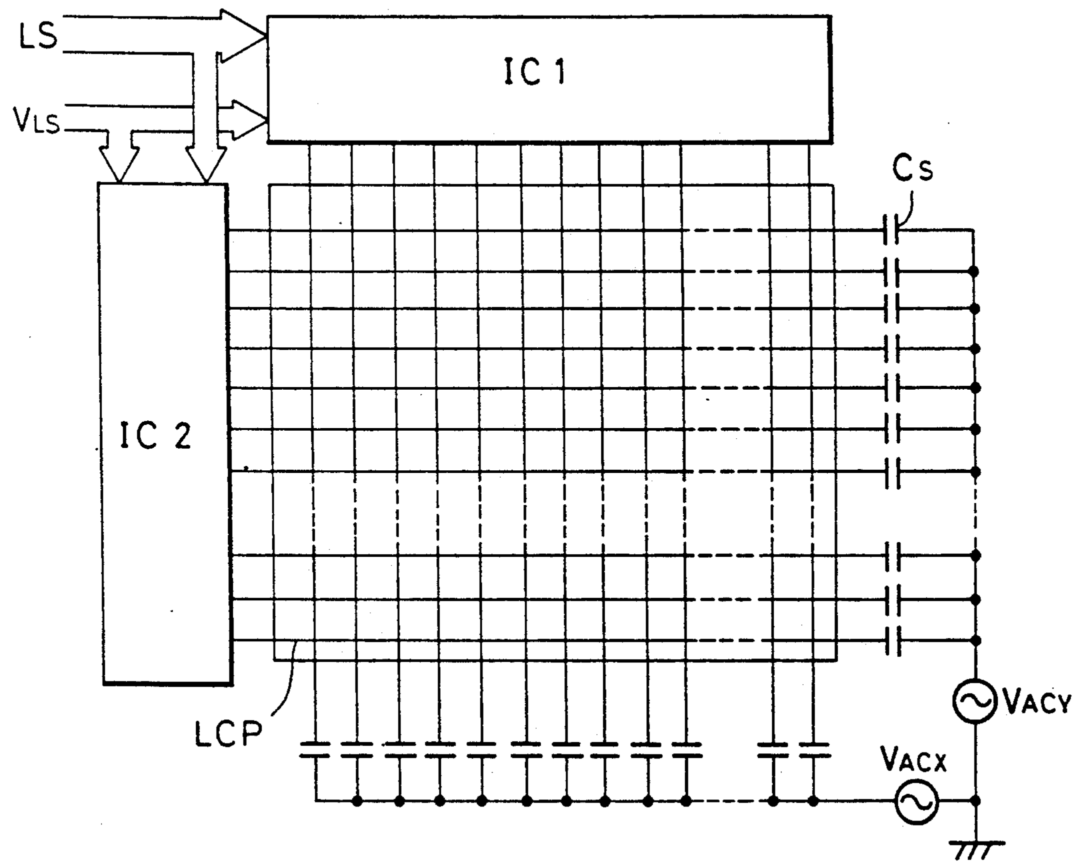
FIG. 19 is a drawing of another embodiment of the driving circuit for the liquid crystal panel shown in FIG. 17 which comprises ICs and capacitors.

FIG. 18 shows an embodiment of the driving circuits for the liquid crystal panel shown in FIG. 17 which comprises ICs and buffer amplifiers. FIG. 19 shows another embodiment of the driving circuits for the liquid crystal panel shown in FIG. 17 which comprises ICs and capacitors. In FIGS. 18 and 19, an X electrode driving circuit $IC_1$ and a Y electrode driving circuit $IC_2$, to each of which a logic signal group LS and a reference voltage group VLS are input, output driving voltages to upper and lower electrodes of a liquid crystal panel LCP. The voltage differences between both driving voltages are applied to the liquid crystal. In order to superimpose any desired compensating voltage on the liquid crystal driving voltages, compensating voltages $V_{ACX}$, $V_{ACY}$ are superimposed on each of the electrodes through the buffer amplifiers BF in FIG. 18, and the compensating voltages $V_{ACX}$ and $V_{ACY}$ are superimposed on each of the electrodes through the capacitors C in FIG. 19.

Figure 20:
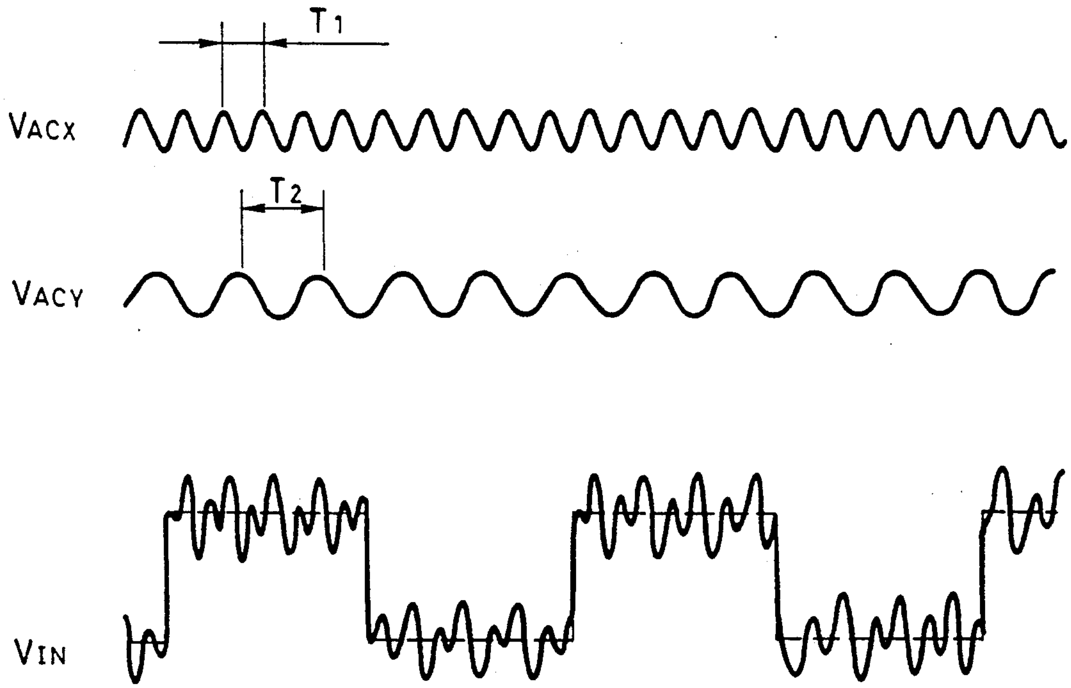
FIG. 20 is a time chart which shows examples of the voltage waveforms in each of the driving circuits shown in FIGS. 18 or 19.

FIG. 20 shows examples of the voltage waveforms of each of the liquid crystal driving circuits shown in FIGS. 18 and 19. The compensating voltages $V_{ACX}$ and $V_{ACY}$ are applied to the X electrodes and the Y electrodes, respectively, so that compensating voltages are superimposed on the liquid crystal driving voltages. The waveform of the liquid crystal driving voltage resulting from the superimposition of the compensating voltages $V_{ACX}$ and $V_{ACY}$ is shown by $V_{IN}$ in FIG. 20. The use of the compensating voltages $V_{ACX}$ and $V_{ACY}$ causes the superimposition of any desired compensating voltages on the liquid crystal driving voltages and thus a decrease in the effect of variations in waveform distortion, which causes the occurrence of crosstalk.

The use of the driving circuits of this embodiment permits a decrease in the effect of waveform distortion of a liquid crystal driving voltage, which depends upon the content displayed on the liquid crystal panel, on variations in the effective values of the liquid crystal driving voltages. It is therefore possible to decrease variations in the effective values of the liquid crystal voltages applied to the pixels having the same brightness data, decrease variations in brightness and prevent the occurrence of crosstalk.

The compensating voltages $V_{ACX}$ and $V_{ACY}$ shown in FIG. 20 are only examples, the present invention is not limited to them. The shape, period, amplitude and application time of the waveform of each of the compensating voltages can be changed within a range, in which the effect of the invention can be obtained, according to the states of waveform distortion of the liquid crystal driving voltages. Each of the compensating voltages $V_{ACX}$ and $V_{ACY}$ may be a voltage for masking the waveform distortion of a liquid crystal driving voltage by constantly changing the waveform thereof. The compensating voltages $V_{ACX}$ and $V_{ACY}$ need not always have periodicity.

In the embodiments shown in FIGS. 18 and 19, the buffer amplifiers or the capacitors are used for superimposing the compensating voltages $V_{ACX}$ and $V_{ACY}$ on the liquid crystal driving voltages. However, the present invention is not limited to this, and any elements or circuits having the function to add a voltages to a voltage can be used in place of the operational amplifiers and the capacitors.

In this embodiment, any desired compensating voltage can be applied to both of the X and Y electrodes. However, a compensating voltage may be applied to one of the electrodes. The compensating voltages need not have the same waveform.

Figure 21:
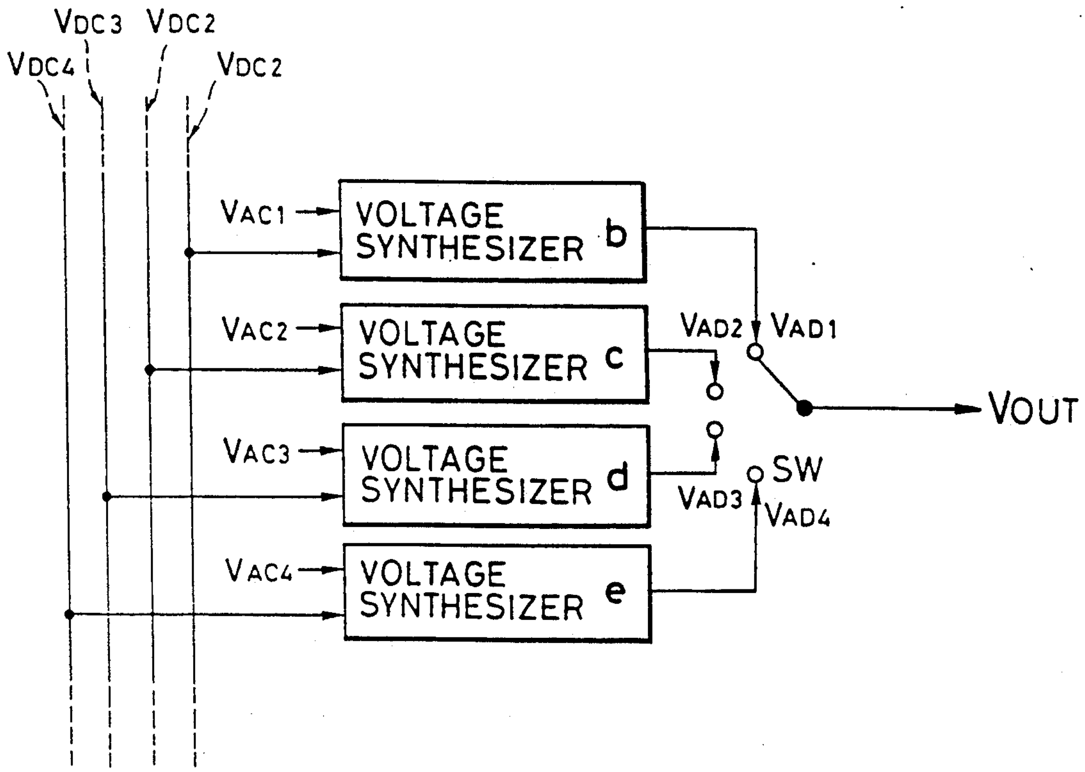
FIG. 21 is a block diagram of the basic arrangement of a driving circuit for respectively superimposing compensating voltages on a plurality of reference voltages and then selecting the required voltages.

FIG. 21 is a drawing of the basic arrangement of a driving circuit which has the function to select necessary driving voltages from the liquid crystal driving voltages compensated for which are formed by superimposing compensating voltages having any desired waveform on some of a plurality of reference voltages.

In the driving circuit, compensating voltages $V_{AC1}$ to $V_{AC4}$ are first respectively superimposed on reference voltages $V_{DC1}$ to $V_{DC4}$ in voltage synthesizers b to e, and voltages are then selected from superimposed voltages $V_{AD1}$ to $V_{AD4}$ by a switch SW which is operated by a control signal output from the outside to form liquid crystal driving voltages.

The operation of the circuit shown in FIG. 21 is described below with reference to the examples of voltage waveforms shown in FIG. 22.

The reference voltages $V_{DC1}$, $V_{DC2}$, $V_{DC3}$, $V_{DC4}$ are combined with the compensating voltages $V_{AC1}$, $V_{AC2}$, $V_{AC3}$, $V_{AC4}$ having periods of $T_{21}$, $T_{22}$, $T_{23}$, $T_{24}$, respectively, in the voltage synthesizers b, c, d, e to form the superimposed voltages $V_{AD1}$, $V_{AD2}$, $V_{AD3}$, $V_{AD4}$, respectively. The switch SW selects necessary voltages from the superimposed voltages $V_{AD1}$ to $V_{AD4}$ with a period of $T_{SW2}$ to form a liquid crystal driving voltage $V_{out}$.

Figure 23:
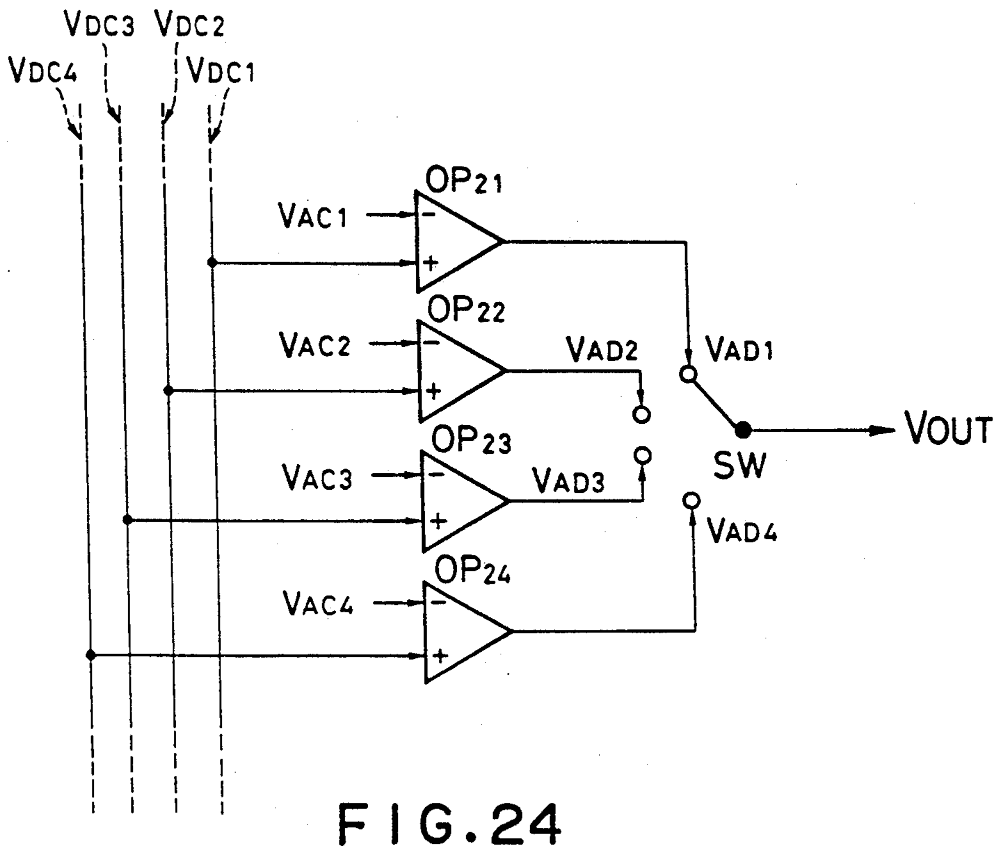
FIG. 23 is a drawing of the circuit of an embodiment of the driving circuit shown in FIG. 21 which comprises buffer amplifiers and a switch.
Figure 24:
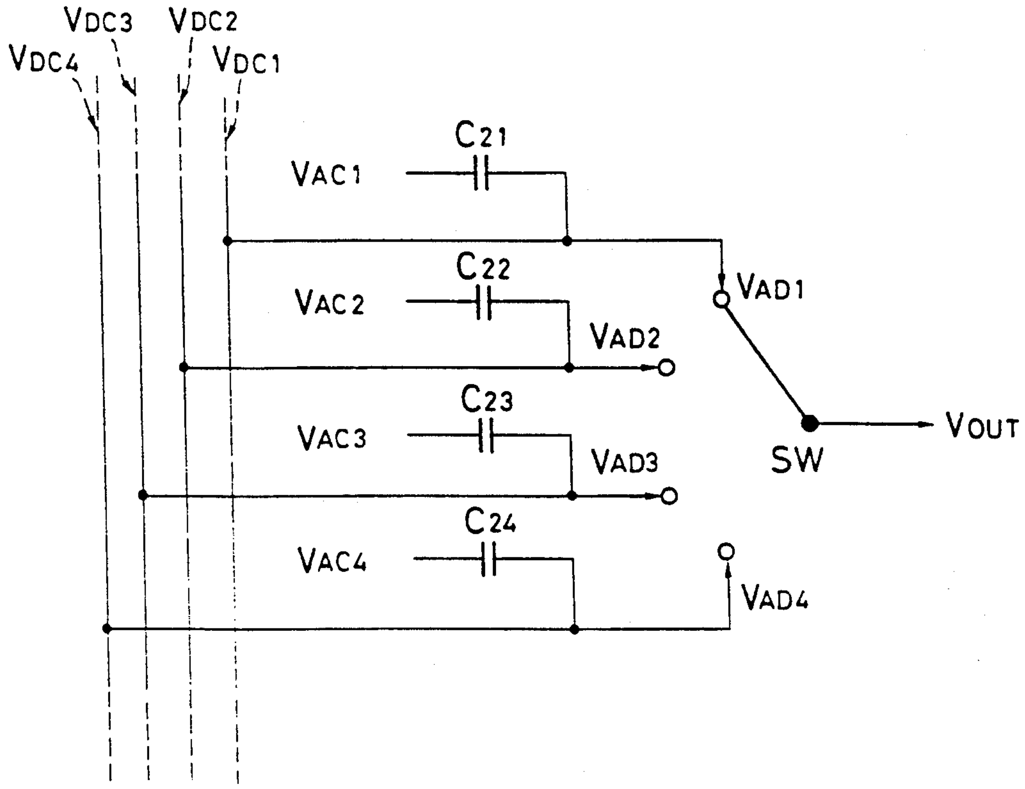
FIG. 24 is a drawing of the circuit of another embodiment of the driving circuit shown in FIG. 21 which comprises capacitors and a switch.

FIGS. 23 and 24 show more specific embodiments based on the concept of the embodiment shown in FIG. 21.

Reference voltages $V_{DC1}$ to $V_{DC4}$ are combined with compensating voltages $V_{AC1}$ to $V_{AC4}$ to form superimposed voltages $V_{AD1}$ to $V_{AD4}$, respectively, by using operational amplifiers $OP_{21}$ to $OP_{24}$ in FIG. 23 and by using capacitors $C_{21}$ to $C_{24}$ in FIG. 24. The switch SW selects voltages from the superimposed voltages $V_{AD1}$ to $V_{AD4}$ to form a liquid crystal driving voltage $V_{out}$ on the basis of the control signal output from the outside. Liquid crystal driving circuits output liquid crystal driving voltages to both the X electrodes and Y electrodes of the liquid crystal panel. The voltage differences are applied to the liquid crystal.

The compensating circuit of this embodiment is used in at least one of the X electrode driving circuit and the Y electrode driving circuit so that any desired compensating voltages can be superimposed on the liquid crystal driving voltages. The use of the superimposed voltages causes a decrease in the effect of waveform distortion which causes the occurrence of crosstalk.

The driving circuit of this embodiment permits a decrease in the effect of waveform distortion of the voltages applied to the liquid crystal, which depends upon the content displayed on the liquid crystal panel, on variations in the effective values of the liquid crystal driving voltages. It is therefore possible to reduce variations in the effective values of the liquid crystal driving voltages applied to the pixels having the same brightness data, reduce variations in brightness and prevent the occurrence of crosstalk.

Figure 22:
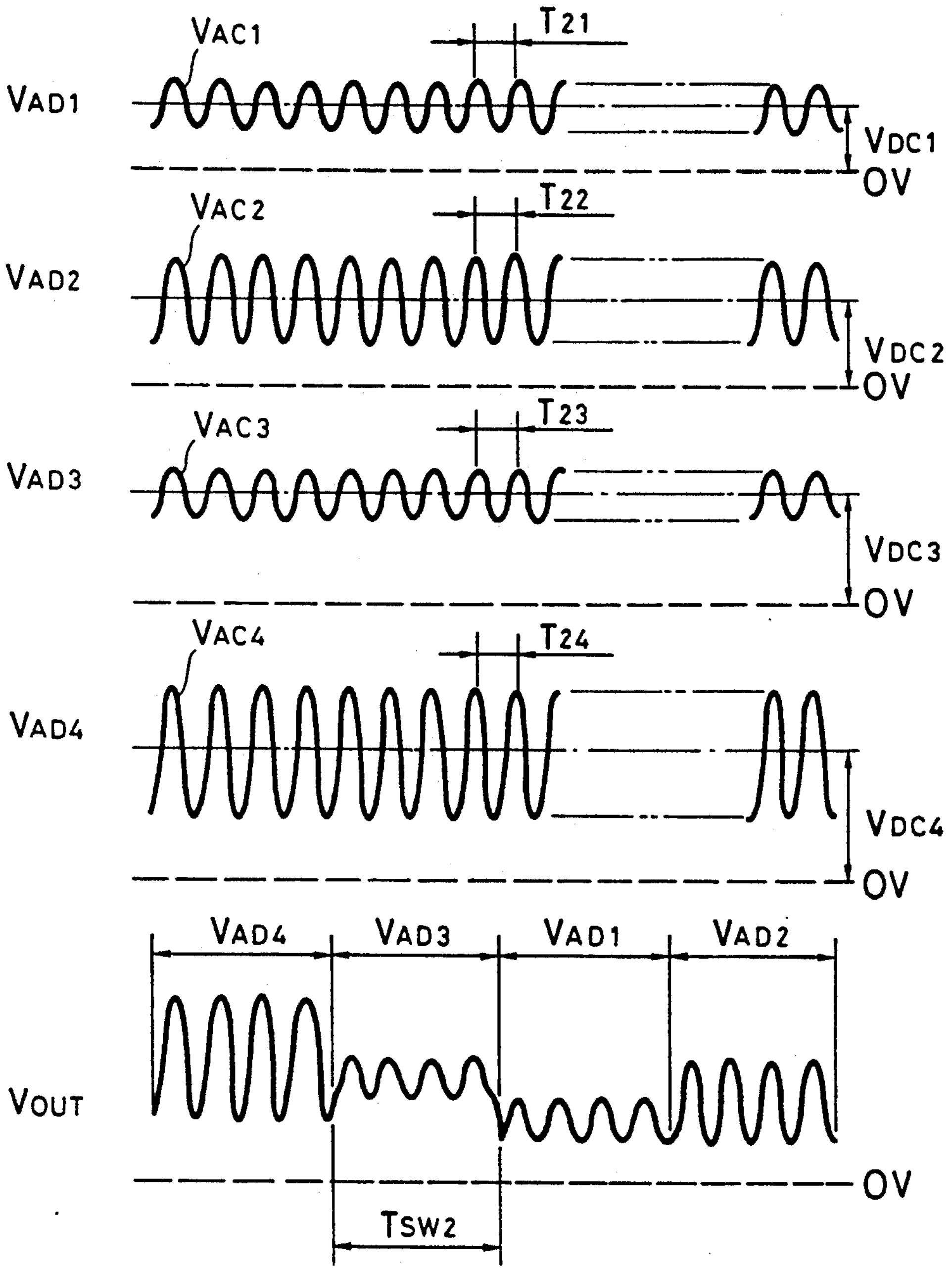
FIG. 22 is a time chart which shows examples of the waveforms in the driving circuit shown in FIG. 21.

The compensating voltages $V_{AD1}$ to $V_{AD4}$ shown in FIG. 22 are only examples, and the present invention is not limited to them. The shape, period, amplitude and application time of each of the compensating voltages can be changed within a range in which the effect of the invention can be obtained, according to the states of the waveform distortion of liquid crystal driving voltages. Each of the compensating voltages $V_{AD1}$ to $V_{AD4}$ may be a voltage for masking the waveform distortion of a liquid crystal driving voltage by constantly changing the waveform thereof. The compensating voltages $V_{AD1}$ to $V_{AD4}$ need not always have periodicity. The compensating voltages need not be superimposed on all the reference voltages $V_{DC1}$ to $V_{DC4}$, and they may be superimposed on any desired reference voltages which allow the effect of the present invention to be obtained.

Figure 25:
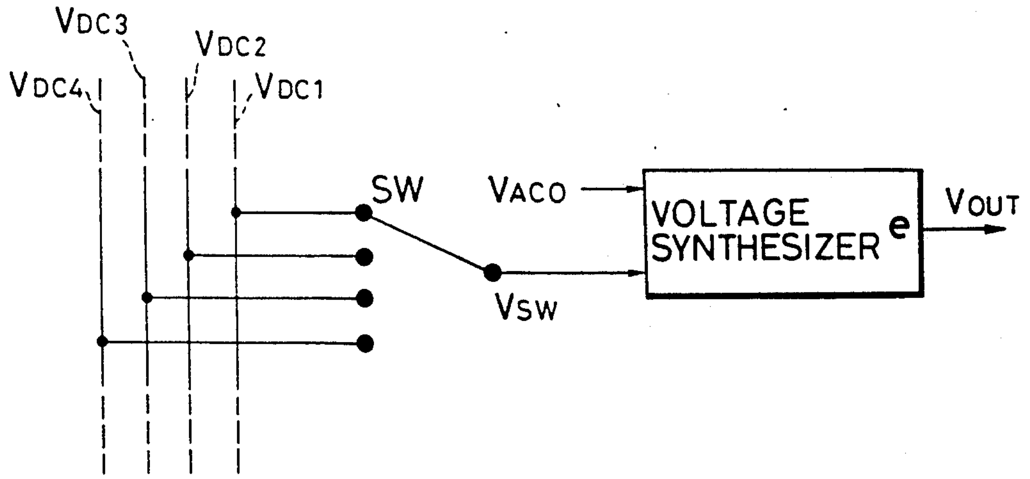
FIG. 25 is a block diagram of the basic circuit of a driving circuit for selecting voltages from a plurality of reference voltages and then superimposing a compensating voltage on the voltage selected.

FIG. 25 is a drawing of the basic arrangement of a driving circuit which has the function to select necessary reference voltages from a plurality of reference voltages and then superimpose a compensating voltage having any desired waveform on the necessary reference voltages selected.

In the driving circuit, a voltage is selected from reference voltages $V_{DC1}$ to $V_{DC4}$ by a switch SW which is operated by the control signal output from the outside, and a common compensating voltage $V_{ACO}$ is superimposed on the selected reference voltage to output a composite voltage $V_{out}$.

The operation of the driving circuit shown in FIG. 25 is described below with reference to the voltage waveforms shown in FIG. 26.

The switch SW selects a voltage from the reference voltages $V_{DC1}$ to $V_{DC4}$ to form a voltage $V_{SW}$. The composite voltage $V_{SW}$ is combined with the compensating voltage $V_{ACO}$ in the voltage synthesizer to output a liquid crystal driving voltage $V_{OUT}$ from the driving circuit.

Figure 27:
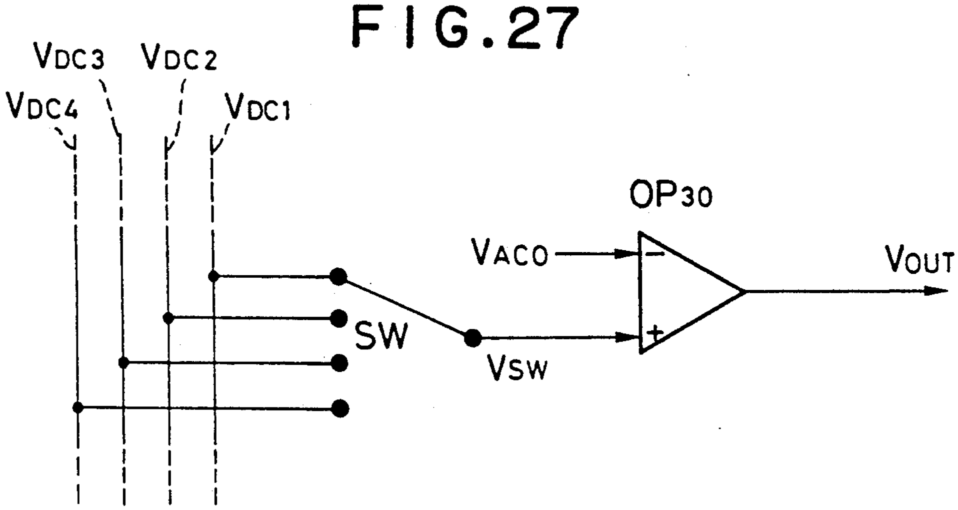
FIG. 27 is a drawing of the circuit of an embodiment of the driving circuit shown in FIG. 25 which comprises a switch and a buffer amplifier.
Figure 28:
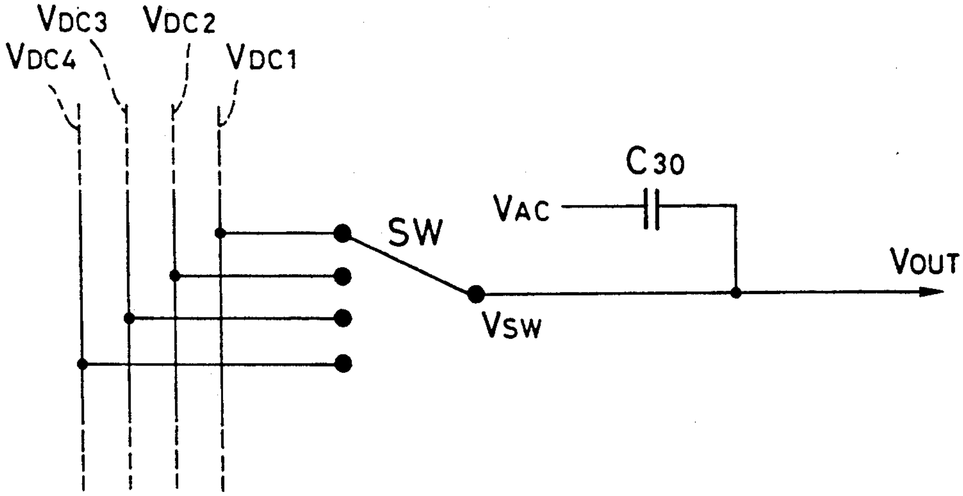
FIG. 28 is a drawing of the circuit of another embodiment of the driving circuit shown in FIG. 25 which comprises a switch and a capacitor.

FIGS. 27 and 28 show more specific embodiments based on the concept of the embodiment shown in FIG. 25.

The composite voltage $V_{SW}$ is combined with the compensating voltage $V_{ACO}$ by using an operational amplifier $OP_{30}$ in FIG. 27 and by using a capacitor $C_{30}$ in FIG. 28 to obtain the liquid crystal driving voltage $V_{OUT}$.

Liquid crystal driving circuits respectively output liquid crystal driving voltages to the X electrodes and the Y electrodes of the liquid crystal panel so that the voltage differences are applied to the liquid crystal. When the compensating circuit of this embodiment is used in at least one of the X electrode driving circuit and the Y electrode driving circuit, any desired compensating voltage can be superimposed on the liquid crystal driving voltages. The resultant superimposed voltages causes a decrease in the effect of waveform distortion which causes the occurrence of crosstalk.

The use of the liquid crystal driving circuits of the present invention permits a decrease in the effect of the waveform distortion of liquid crystal driving voltages, which depends upon the content displayed on the liquid crystal panel, on variations in the effective values of the liquid crystal driving voltages. It is therefore possible to reduce variations in the effective values of the liquid crystal driving voltages applied to pixels having the same brightness data, decrease variations in brightness and prevent the occurrence of crosstalk.

Figure 26:
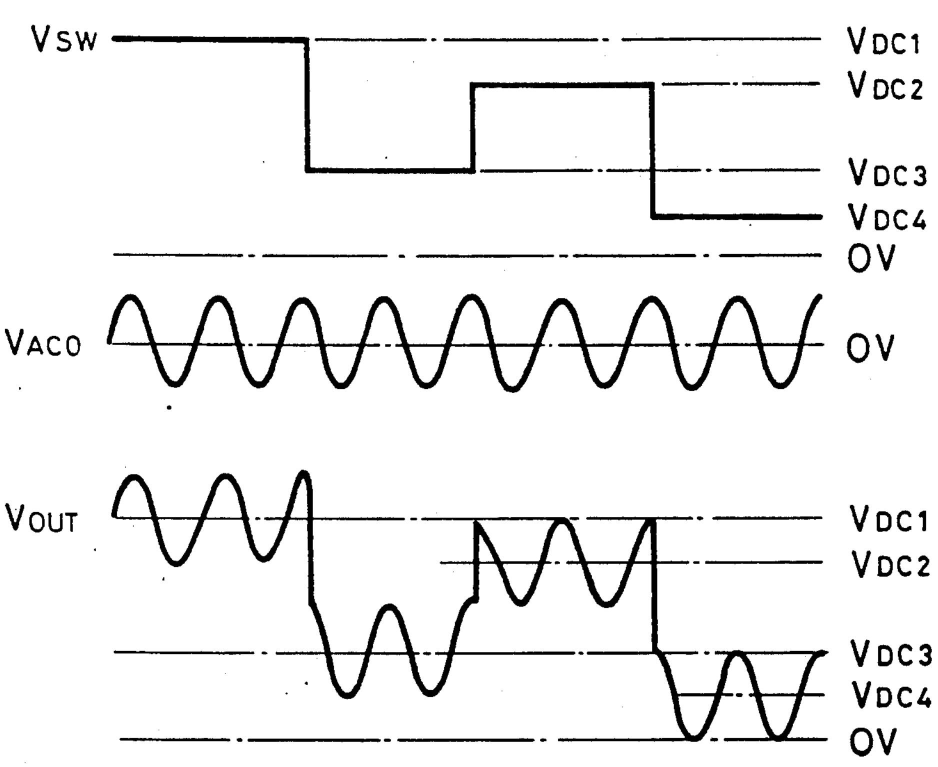
FIG. 26 is a time chart which shows examples of the voltage waveforms in the driving circuit shown in FIG. 25.

The compensating voltage $V_{ACO}$ shown in FIG. 26 is only an example, and the present invention is not limited to this. The shape, period, amplitude and application time of the waveform of the compensating voltage can be changed within a range in which the effect of the present invention can be obtained, according to the states of the waveform distortion of the liquid crystal driving voltages. The compensating voltage $V_{ACO}$ may be a voltage for masking the waveform distortion of a liquid crystal driving voltage by constantly changing the waveform thereof. The compensating voltage $V_{ACO}$ need not always have periodicity.

An embodiment of the present invention is described below with reference to FIGS. 29 to 31. The liquid crystal matrix panel used in this embodiment was formed by sandwiching a TN liquid crystal with a twist angle of 260° in between glass plates and then bonding a film phase plate to each of the glass plates for the purpose of compensating colors. The number of the display dots was 640 (the number of X electrodes)×480 (the number of Y electrodes).

The driving method used was a time division driving method using a direct driving method with a duty ratio of 1/480. The frame frequency and the bias ratio a were set to 60 Hz and 1/19 respectively.

Figure 29:
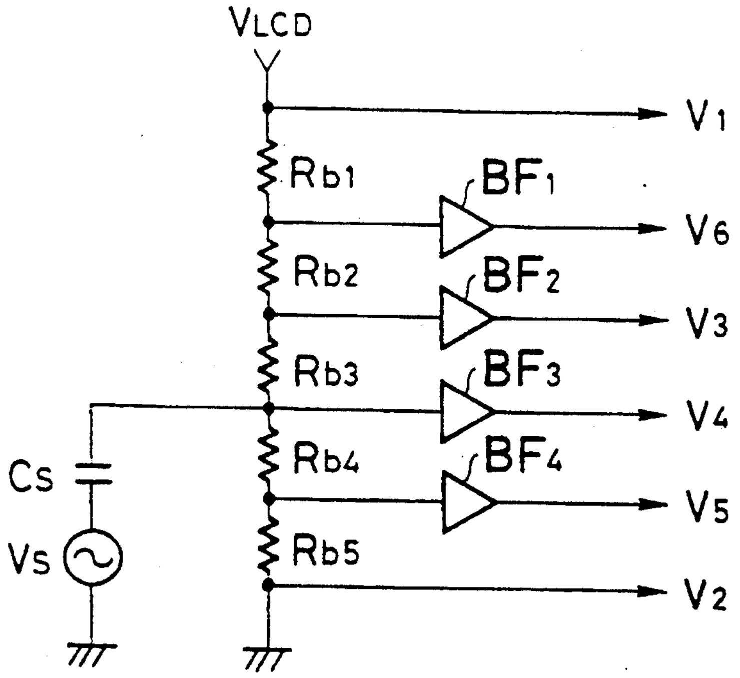
FIGS. 29, 30 and 31 show an example of an actual liquid crystal panel driver with a driving circuit therefor according to the invention.

FIG. 29 is a drawing of a typical embodiment of a power circuit in accordance with the present invention. In the drawing, resistors $R_{b1}$ to $R_{b5}$ are voltage dividing resistors for a liquid crystal driving power voltage $V_{LCD}$ so as to divide the liquid crystal driving power voltage $V_{LCD}$ to obtain reference voltages $V_1$ to $V_6$. The bias ratio a was set to 1/19, and the reference voltages $V_1$ to $V_6$ were set so that $V_1=V_{LCD}$, $V_6=V_{LCD}\times 18/19$, $V_3=V_{LCD}\times 17/19$, $V_4=V_{LCD}\times 2/19$, $V_5=V_{LCD}\times 1/19$ and $V_2=0$. The liquid crystal driving power voltage $V_{LCD}$ was set to 33.76 V with which a good display could be obtained.

Amplifiers $BF_1$ to $BF_4$ were power amplifiers for the reference voltages respectively obtained by the voltage dividing resistors $R_{b1}$ to $R_{b5}$. Vs denotes a compensating voltage which was a sine wave alternating current voltage and which was applied between the resistors $R_{b3}$ and $R_{b4}$ through a capacitor $C_S$ (0.1 μF) so that a voltage, which changes with time, is superimposed on liquid crystal driving voltages.

Figure 30:
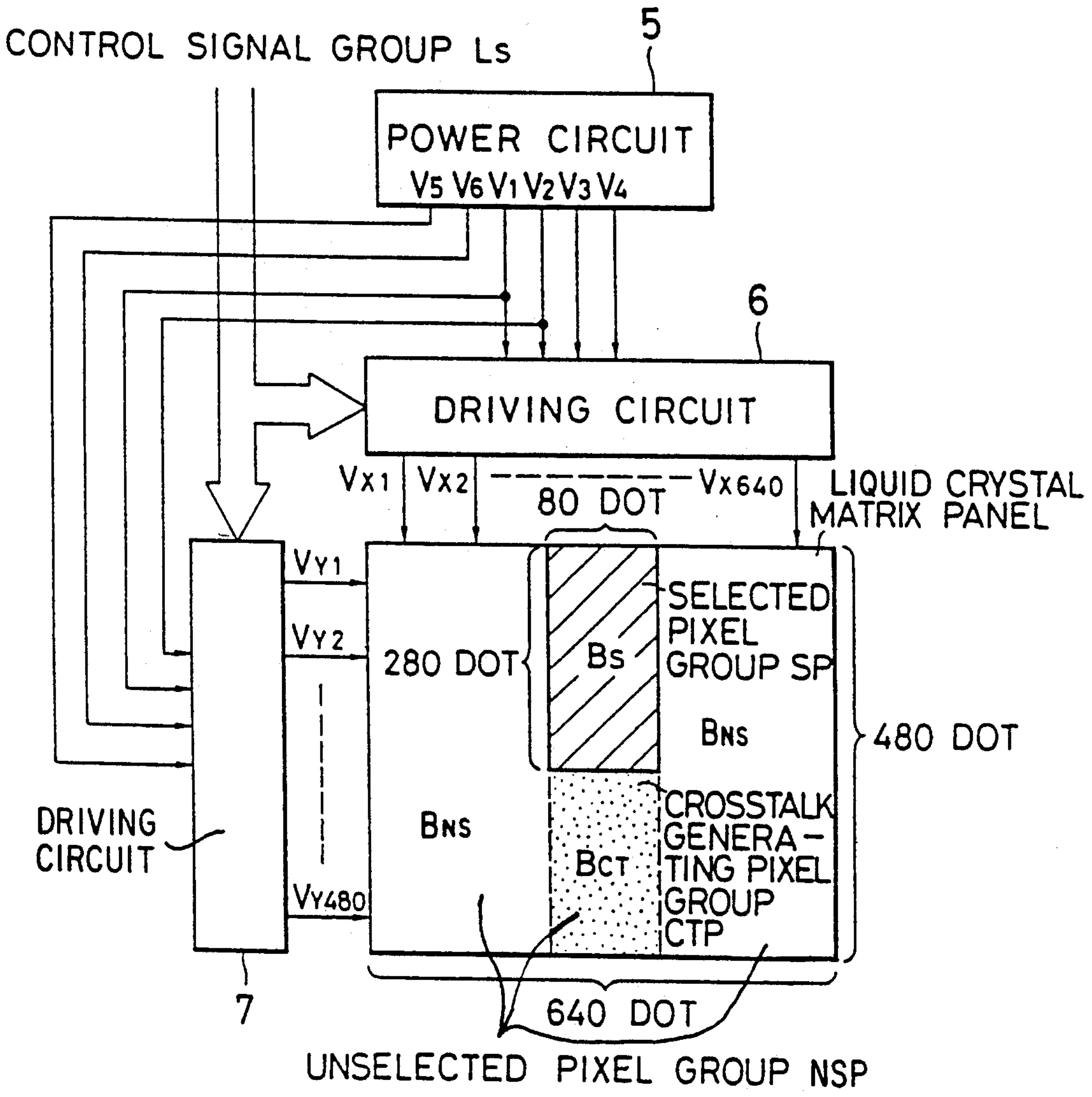

FIG. 30 is a block diagram of the liquid crystal display used in the embodiment of the present invention which shows a display image used for evaluating crosstalk. The reference voltages $V_1$ to $V_6$ output from a power circuit 5 having the arrangement shown in FIG. 29 are input to a driving circuit 6 on the X electrode side and a driving circuit 7 on the Y electrode side. The driving circuits 6, 7 combine the voltages selected from the reference voltages in a time division manner to output liquid crystal driving voltages $V_{X1}$, $V_{X2}$, . . . , $V_{X640}$, $V_{Y1}$, $V_2$, . . . , $V_{Y480}$. The application of the voltages causes the liquid crystal driving voltages shown in FIG. 5 to be applied to each of the pixels. Since the voltages obtained from the compensating voltage $V_S$ shown in FIG. 9 are respectively superimposed on the reference voltages $V_1$ to $V_6$, the voltage, which changes with time, is superimposed on the liquid crystal driving voltages.

When the area of the selected pixels is increased in the scanning direction, crosstalk is caused by variations in brightness of the unselected pixels on the X electrode on which the selected pixels are present. The bar graph-like display shown by a selected pixel group SP having 80 dots on the X electrode side and 280 dots on the Y electrode side was used as a display image for evaluating crosstalk. In this case, crosstalk occurs in the unselected pixel group NSP on the X electrode on which the selected pixel group is present. In this embodiment, the display state is set so that the selected pixels are in a bright transmission state, and the unselected pixels are in a dark nontransmission state. Assuming that the brightness of the selected pixel group, the brightness of the pixel group in the selected pixel group which produces crosstalk and the brightness of the pixel group in the selected pixel group which produces no crosstalk are $B_S$, $B_{CT}$ and $B_{NS}$, respectively, the general relation, $B_S > B_{CT} > B_{NS}$ is established.

Figure 31:
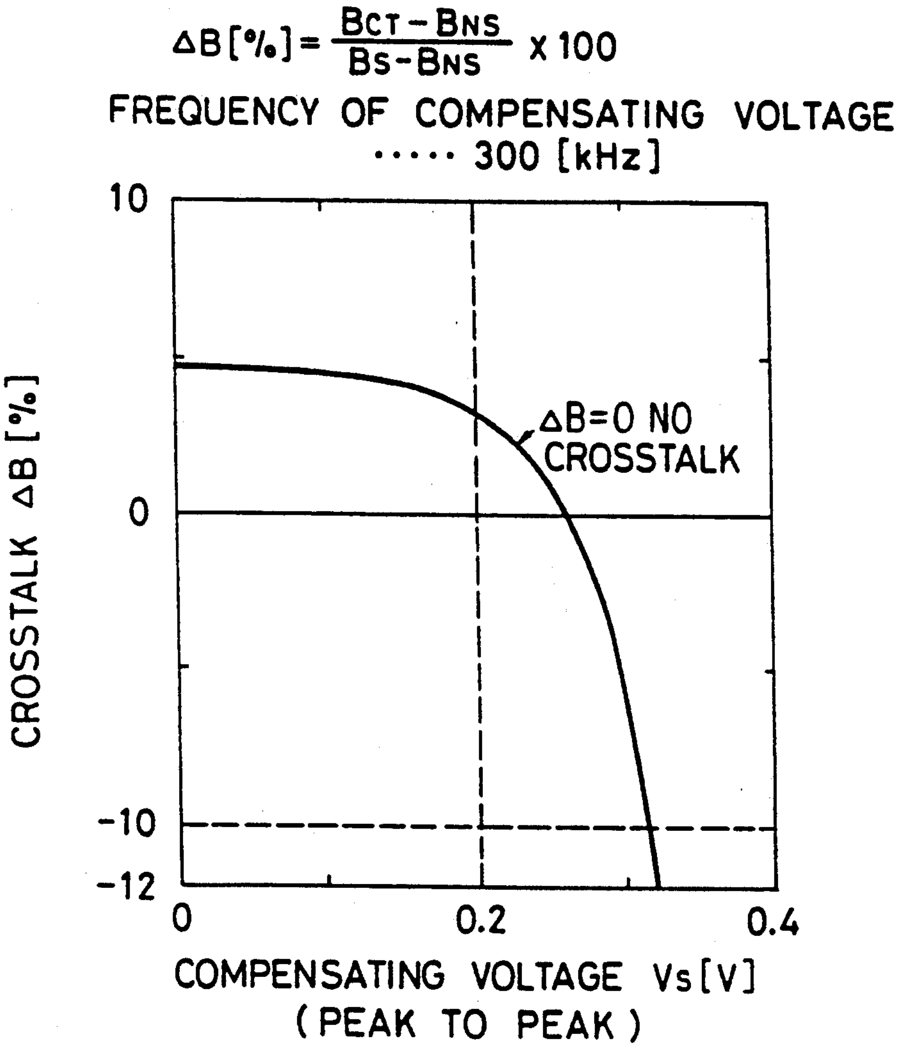

FIG. 31 is a drawing which shows the effect of reducing crosstalk in the present invention. Crosstalk ΔB is shown by relative brightness expressed by a ratio by percentage of a brightness difference $B_S - B_{NS}$ to a brightness difference $B_{CT} - B_{NS}$ on the basis of $B_{NS}$. When a ΔB value is positive, the brightness of crosstalk is higher than that of the surrounding unselected pixel group NSP, and when a ΔB value is negative, the brightness is low. When ΔB=0, no crosstalk occurs in the display.

In FIG. 31, an alternating voltage of a sine wave with a frequency 30 kHz was applied as a compensating voltage $V_S$. The amplitude voltage value from the peak to the peak in the compensating voltage $V_S$ is shown on the abscissa.

When $V_S \leqq 0.26$, the absolute value of crosstalk ΔB decreases with a increase in $V_S$ and becomes zero near $V_S = 0.26$. When $0.26\ V < V_S$, the absolute value of ΔB increases. A high quality display without any crosstalk can be thus obtained by applying as the compensating voltage $V_S$ an alternating voltage of a sine wave having a frequency of 30 kHz and an amplitude voltage value from the peak to the peak of about 0.26 V.

As a result of the same evaluation as that described above with the exception that the frequency of the compensating voltage $V_S$ was changed, the same effect was obtained by applying an alternating voltage of a sine wave with a frequency within 60 Hz, which was the frame frequency of the liquid crystal display used in the embodiment of the present invention, to 70 kHz,. However, the amplitude voltage value, at which DB=0, depends upon the frequency used. In addition, a frequency of not more than a half of the product 28.8 kHz of the frame frequency and the reciprocal of the driving duty is undesirable because the variations in brightness caused by the amplitude of the compensating voltage $V_S$ adversely affects the display characteristics. A frequency band within 14.4 kHz to 70 kHz is therefore preferable for practical use.

In the embodiment shown in FIGS. 28 to 31, the application as the compensating voltage $V_S$ of an alternating voltage of a sine wave with a frequency within the frame frequency to 70 kHz permits a decrease in variations in brightness of the pixels having the same brightness data and the prevention of the occurrence of crosstalk.

The compensating voltage $V_S$ is not limited to a sine wave and it may be a variable voltage with the same frequency component as that described above.

Figure 32:
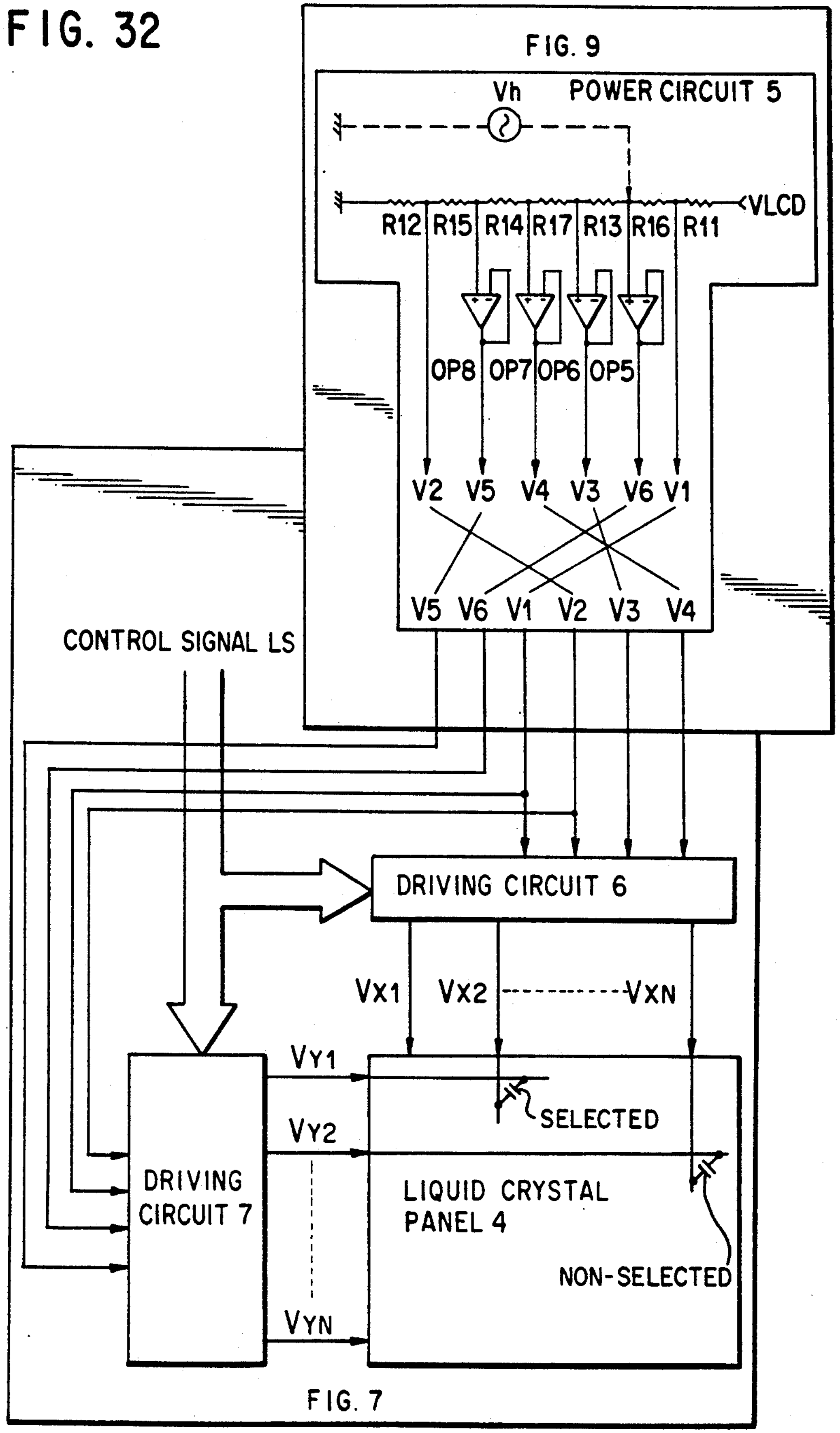
FIG. 32 illustrates an embodiment of the present invention by which compensation voltages are applied so as to affect the reference voltages shown in the preceding figures.

FIG. 32 illustrates an embodiment of the present invention wherein a different compensating voltage is applied to each of the x or y electrodes where the compensating voltage is directly applied to the reference voltages.

This embodiment employs a circuit shown in FIG. 9, as the power circuit 5 of the liquid crystal display which is shown in FIG. 7. The following description of operation and effect of this embodiment also applies to those cases where any of the circuits shown in FIGS. 12, 14, 21, 23 or 24 is used as the power circuit 5, in place of the circuit shown in FIG. 9.

Referring to FIG. 32, the power circuit 5 (FIG. 9) delivers a voltage signal of the waveform shown in FIG. 10 to the driving circuit 6 and the driving circuit 7, so that the following conditions are established:

$$V1 = V10 + Vi,$$

$$V6 = V60 + Vh,$$

$$V3 = V30 + Vj,$$

$$V4 = V40 + Vk,$$

$$V5 = V50 + Vl,$$

$$V2 = V20 + Vm,$$

$$V10 = VLCD\ (R12 + R15 + R14 + R17 + R13 + R16)/R,$$

$$V60 = VLCD\ (R12 + R15 + R14 + R17 + R13)/R,$$

$$V30 = VLCD\ (R12 + R15 + R14)/R,$$

$$V40 = VLCD\ (R12 + R15)/R,$$

$$V20 = VLCD * R12/R$$

where, $R = R12 + R15 + R14 + R17 + R13 + R16 + R11$.

DC components V10, V60, V30, V40, V50 and V20 are voltages which determine DC levels of the driving voltages for displaying the image, while the compensating voltage components Vi, Vh, Vj, Vk, Vl, Vm are used as compensating voltages applied for the purpose of reducing crosstalk. As can be seen from FIG. 10, the compensating voltages component Vi, . . . , Vm differ from one another according to the levels of the DC voltage components V10, . . . , V60.

The voltage waveform applied to a pixel at a selected point, i.e., a bright display pixel on the liquid crystal panel 8 and the voltage waveform applied to a pixel at a non-selected point, i.e., a dark display pixel, contain different DC components.

As shown in FIG. 5, the voltage applied to the liquid crystal is formed by the driving circuits 6 and 7 by successively combining six DC levels: namely, V0, −V0, (1/a) V0, (1-2/a) V0 and −(1-2/a) V0. The above-mentioned six DC levels are formed from the output voltage V1, . . . , V6 of the power circuit 5.

FIG. 5 shows only waveforms of DC components, while FIG. 1B shows waveforms containing compensating voltages.

The waveforms obtained by superimposing the compensating voltage expressed, for example, as follows:

$V0=V1-V2$ $-V0=V2-V1,$ $(1/a)\ V0=V4-V5,\ V1-V6,$ $-(1/a)\ V0=V3-V6,\ V2-V5,$ $(1\text{-}2/a)\ V0=V3-V2,$ $-(1\text{-}2/a)\ V0=V4-V1.$ The voltage waveforms obtained without superimposition of the compensating voltage are expressed, for example as follows:

$V0=V10-V20,$ $-V0=V20-V10,$ $(1/a)\ V0=V40-V50,\ V10-V60,$ $-(1/a)\ V0=V30-V60,\ V20-V50,$ $(1\text{-}2/a)\ V0=V30-V20,$ $-(1\text{-}2/a)\ V0=V40-V10.$ Whether the state of a pixel is bright or dark is determined depending on the contents of the display. Consequently, the voltage waveforms of the DC components applied to different pixels vary according to the pixels. This DC component is formed from the DC components V10, . . . , V60 contained in the output of the power circuit 5. As explained before, the compensating voltage component also varies when the DC component varies, so that different compensating voltage components are applied to different pixels. Therefore, the voltages shown in FIG. 10 have voltage waveforms with different amplitudes of triangular wave components depending on the contents to be displayed in FIG. 11. FIG. 11 shows a voltage waveform on a pixel.

The voltage applied to the liquid crystal pixel is the voltage difference of VX-VY between the voltage VX applied to the X electrode and the voltage VY applied to the Y electrode. Consequently, a different compensating voltage signal is applied to each of the X (or Y) electrodes.

Figure 33:
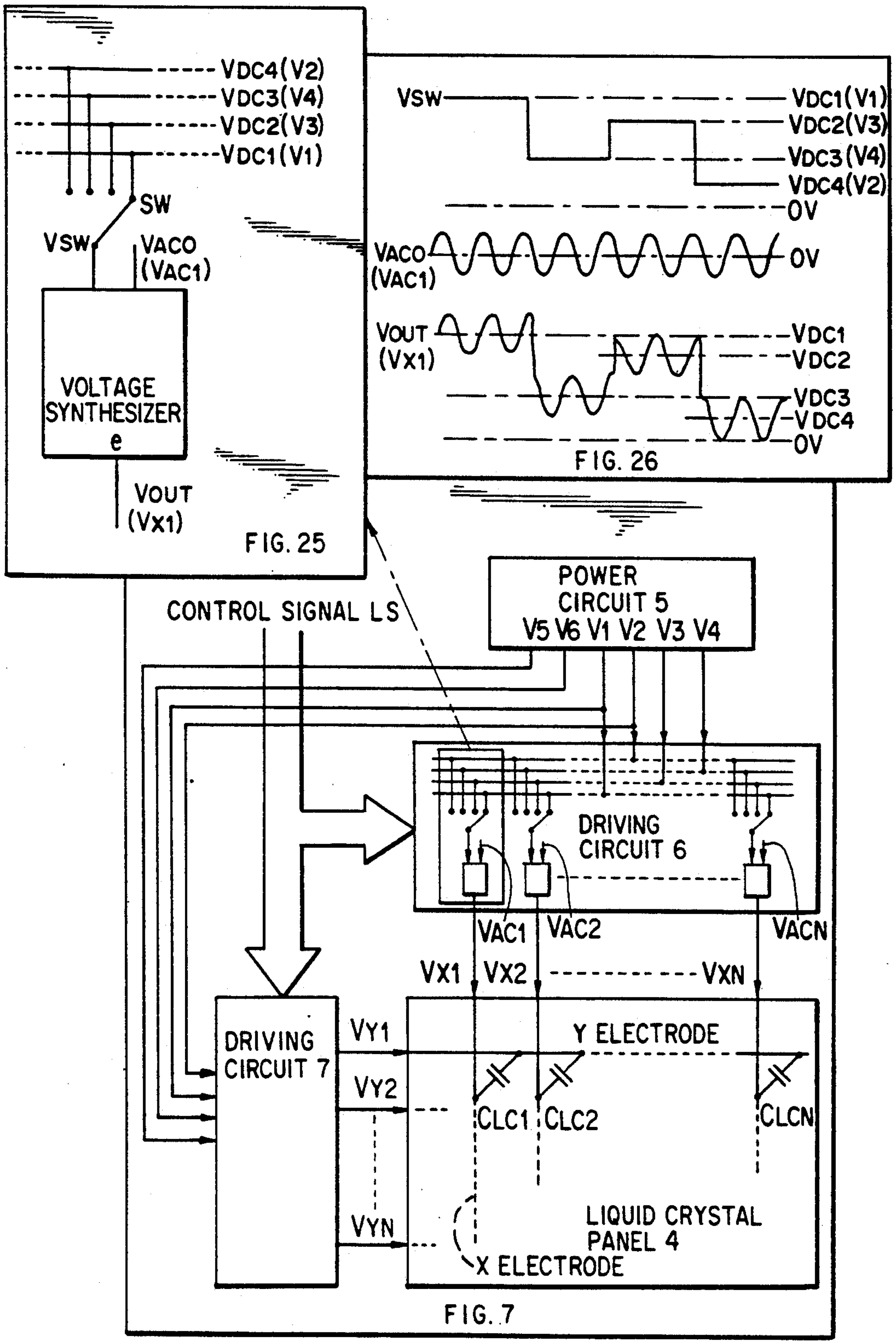
FIG. 33 illustrates an embodiment of the present invention by which compensation voltages are applied so as to more directly affect the liquid crystal driving voltages shown in the preceding figures.

FIG. 33 illustrates an embodiment of the present invention wherein a different compensating voltage is applied to each of the X or Y electrodes where the compensating voltage is directly applied to the liquid crystal driving voltages.

This embodiment employs a circuit shown in FIG. 25, as the switching means for switching and synthesizing reference voltages in the driving circuit 6 of the liquid crystal display which is shown in FIG. 7 of the drawings attached to the original specification. The following description of operation and effect of this embodiment also applies to those cases where the circuit shown in FIG. 27, or FIG. 28, is used as the driving circuit 6, in place of the circuit shown in FIG. 25.

The waveform of signals at several points in FIG. 25 are shown in FIG. 26. Referring to FIG. 25, in the driving circuit 6, a voltage is selected from reference voltage VDC1(=V1), VDC2(=V2), VDC3(=V3) and VDC4(=V4) by a switch SW which is operated by control signal output from the outside and synthesized into voltage VSW. A compensating voltage VACO (VAC1) is superimposed by the voltage synthesizer on the synthesized voltage VSW to output a composite voltage Vout (VX1).

As stated in the specification, the shape, period, amplitude, and application time, of waveform of the compensating voltage can be changed within a range in which the effect of the invention can be obtained for decreasing variation in the effective value of the driving voltages in the entire area of a region including pixels having same brightness data.

The variation in the effective value of the driving voltages depends on the contents of display. Namely, the state of the pixels selected or nonselected on each electrode.

Consequently, the compensating voltages VAC1, VAC2, . . . , VACN in FIG. 25, which supply driving voltages to each electrodes in the driving circuit 6 in FIG. 33, vary according to the contents of the display.

The same technique is also available to the driving circuit 7. Different compensating voltages are applied to the X electrodes and Y electrodes.

Therefore, "a different compensation voltage signal is applied to each of the X (or Y) electrodes."

What is claimed is:

1. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to said X electrodes;

a Y electrode driving circuit applying Y driving voltages to said Y electrodes;

a compensating voltage superimposing circuit applying voltage signals to said X electrodes, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the X electrodes.

2. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to said X electrodes;

a Y electrode driving circuit applying Y driving voltages to said Y electrodes;

a power supply circuit supplying X and Y reference voltages to said X and Y electrode driving circuits;

a compensating voltage superimposing circuit applying voltage signals to said X reference voltages, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the X electrodes.

3. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to said X electrodes;

a Y electrode driving circuit applying Y driving voltages to said Y electrodes;

a power supply circuit supplying X and Y reference voltages to said X and Y electrode driving circuits;

a compensating voltage superimposing circuit superimposing voltage signals each to said X driving voltages in said X electrode driving circuit, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the X electrodes.

4. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to terminals at one end of said X electrodes;

a Y electrode driving circuit applying Y driving voltages to terminals at one end of said Y electrodes;

a compensating voltage superimposing circuit applying voltage signals to terminals on the other end of said X electrodes, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of said terminals on the other end of said X electrodes.

5. A driving method for driving a liquid crystal display of the type having a matrix of liquid crystal pixels which are selectively supplied with X and Y driving voltages through X and Y electrodes, thereby displaying information, said method comprising:

superimposing voltage signals to said X electrodes, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the X electrodes.

6. A driving method for driving a liquid crystal display of the type having a matrix of liquid crystal pixels which are selectively supplied with X and Y driving voltages generated based on X and Y reference voltages from a power supply circuit and supplied by X and Y electrode driving circuits, thereby displaying information, said method comprising:

superimposing voltage signals to said X reference voltages, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the X electrodes.

7. A driving method for driving a liquid crystal display of the type having a matrix of liquid crystal pixels which are selectively supplied with X and Y driving voltages generated based on X and Y reference voltages from a power supply circuit and supplied by X and Y electrode driving circuits, thereby displaying information, said method comprising:

superimposing voltage signals to said X driving voltages, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the X electrodes.

8. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to said X electrodes;

a Y electrode driving circuit applying Y driving voltages to said Y electrodes;

a compensating voltage superimposing circuit applying voltage signals to said Y electrodes, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the Y electrodes.

9. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to said X electrodes;

a Y electrode driving circuit applying Y driving voltages to said Y electrodes;

a power supply circuit supplying X and Y reference voltages to said X and Y electrode driving circuits;

a compensating voltage superimposing circuit applying voltage signals to said Y reference voltages, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the Y electrodes.

10. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to said X electrodes;

a Y electrode driving circuit applying Y driving voltages to said Y electrodes;

a power supply circuit supplying X and Y reference voltages to said X and Y electrode driving circuits;

a compensating voltage superimposing circuit superimposing voltage signals each to said Y driving voltages in said Y electrode driving circuit, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the Y electrodes.

11. A liquid crystal display, comprising:

a liquid crystal matrix panel having a matrix of liquid crystal pixels and X and Y electrodes for selectively applying driving voltages to said pixels to thereby display information;

an X electrode driving circuit applying X driving voltages to terminals at one end of said X electrodes;

a Y electrode driving circuit applying Y driving voltages to terminals at one end of said Y electrodes;

a compensating voltage superimposing circuit applying voltage signals to terminals on the other end of said Y electrodes, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of said terminals on the other end of said Y electrodes.

12. A driving method for driving a liquid crystal display of the type having a matrix of liquid crystal pixels which are selectively supplied with X and Y driving voltages through X and Y electrodes thereby displaying information, said method comprising:

superimposing voltage signals to said Y electrodes, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the Y electrodes.

13. A driving method for driving a liquid crystal display of the type having a matrix of liquid crystal pixels which are selectively supplied with X and Y driving voltages generated based on X and Y reference voltages from a power supply circuit and supplied by X and Y electrode driving circuits, thereby displaying information, said method comprising:

superimposing voltage signals to at least one of said Y reference voltages wherein each of said voltage signals is a high-frequency compensating voltage which continuously varies the waveform of the liquid crystal driving voltages to decrease variation in the effective values of said driving voltages in the entire area of the region including pixels having the same brightness data, wherein a different compensating voltage signal is applied to each of the Y electrodes.

14. A driving method for driving a liquid crystal display of the type having a matrix of liquid crystal pixels which are selectively supplied with X and Y driving voltages generated based on X and Y reference voltages from a power supply circuit and supplied by X and Y electrode driving circuits, thereby displaying information, said method comprising:

superimposing voltage signals to said Y driving voltages, wherein each of said voltage signals is a high-frequency compensating voltage which continuously varies the waveform of the liquid crystal driving voltages to decrease variation in the effective values of said driving voltages in the entire area of a region including pixels having the same brightness data, wherein a different compensating voltage signal is applied to each of the Y electrodes.

* * * * *

UNITED STATES PATENT AND TRADEMARK OFFICE

CERTIFICATE OF CORRECTION

PATENT NO. : 5,301,047

DATED : April 5, 1994

INVENTOR(S) : Minoru Hoshino et al.

It is certified that error appears in the above-identified patent and that said Letters Patent is hereby corrected as shown below:

IN THE TITLE PAGE: Change "[54] LIQUID CRYSTAL DISPLAY" to --LIQUID CRYSTAL DEVICE WITH A DIFFERENT COMPENSATING VOLTAGE AT EACH X AND/OR Y ELECTRODE--.

IN THE ABSTRACT, last line, after "circuit." insert
(Item 57) --A different driving voltage can be applied to each X and/or Y electrode.--

| Column | Line | Corrections |
|---|---|---|
| 1 | 1 | Change the title to read --LIQUID CRYSTAL DEVICE WITH A DIFFERENT COMPENSATING VOLTAGE AT EACH X AND/OR Y ELECTRODE --. |
| 1 | 37 | After "hinders" delete "to--. |
| 4 | 15 | Before "DESCRIPTION" insert --DETAILED--. |
| 13 | 21 | Change "$V_2$," to --$V_{Y2}$,--. |

Signed and Sealed this

Twentieth Day of September, 1994

Attest:

Bruce Lehman

BRUCE LEHMAN

*Attesting Officer*

*Commissioner of Patents and Trademarks*